US009290131B2

(12) United States Patent
Sautter et al.

(10) Patent No.: US 9,290,131 B2
(45) Date of Patent: Mar. 22, 2016

(54) CARRIER FOR A VEHICLE

(71) Applicant: Yakima Products, Inc., Lake Oswego, OR (US)

(72) Inventors: Chris Sautter, Portland, OR (US); Dave Condon, Wilsonville, OR (US); Kevin E. Lesley, Beaverton, OR (US)

(73) Assignee: Yakima Products, Inc., Lake Oswego, OR (US)

( * ) Notice: Subject to any disclaimer, the term of this patent is extended or adjusted under 35 U.S.C. 154(b) by 6 days.

(21) Appl. No.: 13/954,891

(22) Filed: Jul. 30, 2013

(65) Prior Publication Data
US 2014/0158727 A1 Jun. 12, 2014

Related U.S. Application Data

(60) Provisional application No. 61/677,424, filed on Jul. 30, 2012, provisional application No. 61/699,137, filed on Sep. 10, 2012.

(51) Int. Cl.
*B60R 9/055* (2006.01)
(52) U.S. Cl.
CPC ...................................... *B60R 9/055* (2013.01)
(58) Field of Classification Search
CPC ....................................................... B60R 9/055
USPC ........ 224/315, 328; 292/DIG. 5, DIG. 17, 21, 292/92, 109, 113, 118, 123, 126, 97, 102, 292/108, 226; 70/71, 81, 99, 100, 134, 168, 70/172; 16/230, 231, 232
See application file for complete search history.

(56) References Cited

U.S. PATENT DOCUMENTS

| 1,313,687 A | 8/1919 | Hellweg |
| 2,483,947 A | 10/1949 | Turner |
| 3,008,177 A | 11/1961 | Wooten, Jr. |

(Continued)

FOREIGN PATENT DOCUMENTS

| AU | 7150596 A | 4/1997 |
| CN | 201176142 Y | 1/2009 |

(Continued)

OTHER PUBLICATIONS

U.S. Patent and Trademark Office, Office action regarding U.S. Appl. No. 13/702,989, filed Jan. 29, 2015, 29 pages.
International Searching Authority of the Australian Patent Office regarding PCT Application No. PCT/NZ2011/000018, International Search Report and the Written Opinion dated Jun. 7, 2011, 14 pages.
International Searching Authority of the Australian Patent Office regarding PCT Application No. PCT/NZ2011/000078, International Search Report and Written Opinion dated Aug. 16, 2011, 12 pages.
International Preliminary Examining Authority of the Australian Patent Office regarding PCT Application No. PCT/ NZ2011/000018, International Preliminary Report on Patentability dated Oct. 19, 2011, 10 pages.

(Continued)

*Primary Examiner* — J. Gregory Pickett
*Assistant Examiner* — Scott McNurlen
(74) *Attorney, Agent, or Firm* — Kolisch Hartwell, P.C.

(57) ABSTRACT

Carrier, such as a cargo box, for a vehicle. In an exemplary embodiment, the cargo box may comprise a bottom portion mountable to a vehicle, and a lid portion that fits together with the bottom portion to form a container for cargo. The container may have a pair of lateral sides opposite each other. The cargo box also may comprise a plurality of hinge-latch members to connect the lid portion to the bottom portion adjacent each lateral side. At least one hinge-latch member adjacent each lateral side may include a hinge, a first latch, and a second latch. The first and second latches may be adjustable individually to connect the lid portion to the bottom portion via the hinge. In another exemplary embodiment, the carrier may comprise a clamp device having a force indicator.

17 Claims, 15 Drawing Sheets

(56) References Cited

U.S. PATENT DOCUMENTS

| | | |
|---|---|---|
| 3,334,197 A | 8/1967 | Boden et al. |
| 3,366,295 A | 1/1968 | Nygaard |
| 3,581,962 A | 6/1971 | Osborn |
| 3,653,235 A * | 4/1972 | Fane et al. .................... 70/38 A |
| 3,660,198 A | 5/1972 | Thiel |
| 3,677,196 A | 7/1972 | Schuller |
| 3,685,061 A | 8/1972 | Wray |
| 3,817,470 A | 6/1974 | Calhoun |
| 3,837,209 A | 9/1974 | Guse |
| 3,861,572 A | 1/1975 | Norris et al. |
| 3,915,362 A | 10/1975 | Hart |
| 4,101,061 A | 7/1978 | Sage et al. |
| 4,217,999 A | 8/1980 | Forsman |
| 4,249,684 A | 2/1981 | Miller et al. |
| 4,274,568 A | 6/1981 | Bott |
| 4,378,898 A * | 4/1983 | Smeenge et al. ............. 224/328 |
| 4,406,387 A | 9/1983 | Rasor |
| 4,420,105 A | 12/1983 | Nepper |
| D289,151 S | 4/1987 | Forsman |
| D297,629 S | 9/1988 | Breger |
| D297,630 S | 9/1988 | Breger |
| D297,631 S | 9/1988 | Breger |
| 4,771,940 A | 9/1988 | Taylor |
| 4,790,256 A | 12/1988 | Levine |
| D299,914 S | 2/1989 | Witte |
| 4,911,348 A | 3/1990 | Rasor et al. |
| 4,953,673 A | 9/1990 | Ambasz |
| 4,974,766 A | 12/1990 | DiPalma et al. |
| 5,018,777 A | 5/1991 | Swenson et al. |
| D326,634 S | 6/1992 | Seaver |
| 5,160,075 A | 11/1992 | Moscovitch |
| 5,181,639 A | 1/1993 | Kvänna |
| D342,049 S | 12/1993 | Harrison |
| 5,280,848 A | 1/1994 | Moore |
| 5,288,003 A | 2/1994 | MacDonald |
| 5,355,556 A | 10/1994 | Lyon |
| 5,357,643 A | 10/1994 | Seals |
| 5,419,479 A | 5/1995 | Evels et al. |
| 5,492,258 A | 2/1996 | Brunner |
| 5,538,169 A | 7/1996 | Moore |
| D373,105 S | 8/1996 | Imotani |
| 5,546,705 A | 8/1996 | Hirtsiefer |
| 5,556,221 A | 9/1996 | Brunner |
| 5,582,313 A | 12/1996 | Envall |
| 5,582,316 A | 12/1996 | Masayoshi et al. |
| 5,667,116 A | 9/1997 | Reinhart et al. |
| 5,673,925 A | 10/1997 | Stewart |
| 5,713,498 A | 2/1998 | Cucci |
| 5,730,343 A | 3/1998 | Settelmayer |
| 5,762,244 A | 6/1998 | Wagner et al. |
| 5,799,848 A | 9/1998 | Wills |
| 5,823,411 A | 10/1998 | Gronwoldt et al. |
| 5,827,036 A | 10/1998 | Steffes et al. |
| 5,845,828 A | 12/1998 | Settelmayer |
| D406,558 S | 3/1999 | Pendergraph |
| 5,924,614 A | 7/1999 | Kuntze et al. |
| D412,881 S | 8/1999 | Behringer |
| 5,947,356 A | 9/1999 | Delong |
| D419,954 S | 2/2000 | Bradt |
| D420,321 S | 2/2000 | McCoy et al. |
| 6,112,964 A | 9/2000 | Cucheran et al. |
| 6,145,719 A | 11/2000 | Robert |
| 6,164,507 A | 12/2000 | Dean et al. |
| 6,234,371 B1 | 5/2001 | Sinn |
| 6,273,311 B1 | 8/2001 | Pedrini |
| 6,296,161 B1 | 10/2001 | Van der Feen et al. |
| 6,296,278 B1 | 10/2001 | Zupancic et al. |
| 6,422,567 B1 | 7/2002 | Mastrangelo et al. |
| D462,312 S | 9/2002 | Klein |
| 6,463,627 B1 | 10/2002 | Hirtsiefer |
| 6,681,971 B2 | 1/2004 | Laverack et al. |
| D489,674 S | 5/2004 | Settelmayer et al. |
| 6,766,929 B2 | 7/2004 | Karlsson |
| 6,779,696 B2 | 8/2004 | Aftanas et al. |
| 6,789,357 B1 | 9/2004 | McCullough |
| 6,843,394 B2 | 1/2005 | Aki |
| 6,918,521 B2 | 7/2005 | Settelmayer et al. |
| 6,948,645 B2 | 9/2005 | Pierce et al. |
| D515,016 S | 2/2006 | Gruner |
| 6,997,497 B2 | 2/2006 | Sagi et al. |
| D519,914 S | 5/2006 | Klein |
| 7,044,345 B2 | 5/2006 | Aftanas |
| D527,337 S | 8/2006 | Klein |
| 7,198,184 B2 | 4/2007 | Aftanas et al. |
| D543,929 S | 6/2007 | D'Andrea et al. |
| 7,258,260 B2 | 8/2007 | Hurd |
| 7,357,283 B2 | 4/2008 | Settelmayer |
| D575,723 S | 8/2008 | Gruner |
| 7,416,098 B2 | 8/2008 | Settelmayer et al. |
| 7,419,074 B2 | 9/2008 | Kamiya et al. |
| 7,441,679 B1 | 10/2008 | Harberts et al. |
| 7,503,470 B2 | 3/2009 | Settelmayer et al. |
| D590,762 S | 4/2009 | Gruner |
| D593,928 S | 6/2009 | Gruner |
| D595,215 S | 6/2009 | Rasche |
| D600,459 S | 9/2009 | Hanagan |
| 7,637,405 B2 | 12/2009 | Emmerling et al. |
| 7,740,157 B2 | 6/2010 | Fisher et al. |
| 7,802,707 B2 | 9/2010 | Aftanas |
| 7,806,306 B2 | 10/2010 | Aftanas |
| 7,845,528 B2 | 12/2010 | McMillan |
| D630,157 S | 1/2011 | Farber |
| 7,896,206 B2 | 3/2011 | Myron et al. |
| 7,980,436 B2 | 7/2011 | Rodden et al. |
| D642,970 S | 8/2011 | Elder et al. |
| 8,074,851 B2 | 12/2011 | Settelmayer et al. |
| D656,082 S | 3/2012 | Gruner |
| 8,387,842 B2 | 3/2013 | Elliott et al. |
| 8,757,457 B2 | 6/2014 | Settelmayer et al. |
| 8,807,407 B2 | 8/2014 | Hubbard et al. |
| D717,228 S | 11/2014 | Sagen |
| D717,719 S | 11/2014 | Sagen |
| 8,905,279 B2 | 12/2014 | Hubbard et al. |
| 2002/0030074 A1 | 3/2002 | Bove et al. |
| 2003/0066852 A1 | 4/2003 | Aftanas et al. |
| 2003/0085247 A1 | 5/2003 | Allen et al. |
| 2003/0205597 A1 | 11/2003 | Ford et al. |
| 2004/0155081 A1 | 8/2004 | Settelmayer et al. |
| 2004/0256427 A1 * | 12/2004 | Settelmayer et al. ......... 224/319 |
| 2005/0036847 A1 | 2/2005 | Brackmann et al. |
| 2005/0045678 A1 | 3/2005 | Hurd |
| 2005/0051585 A1 | 3/2005 | Kamiya et al. |
| 2005/0145639 A1 | 7/2005 | Viklund et al. |
| 2005/0194414 A1 | 9/2005 | Lynch |
| 2005/0274756 A1 | 12/2005 | Seys |
| 2006/0032878 A1 | 2/2006 | Settelmayer et al. |
| 2006/0043130 A1 | 3/2006 | Dabrowski |
| 2007/0114256 A1 | 5/2007 | Rodden et al. |
| 2007/0164066 A1 | 7/2007 | Jones |
| 2007/0194185 A1 | 8/2007 | Carothers et al. |
| 2007/0205240 A1 | 9/2007 | Castro et al. |
| 2007/0257075 A1 | 11/2007 | Fisher et al. |
| 2008/0017679 A1 | 1/2008 | LeBlanc et al. |
| 2008/0169322 A1 | 7/2008 | McMillan |
| 2008/0264989 A1 | 10/2008 | Barquinero et al. |
| 2009/0014489 A1 | 1/2009 | Settelmayer et al. |
| 2009/0090145 A1 * | 4/2009 | Engelberth .................... 70/159 |
| 2010/0078454 A1 | 4/2010 | Sautter et al. |
| 2010/0084447 A1 * | 4/2010 | Elliott et al. .................. 224/319 |
| 2010/0084448 A1 | 4/2010 | Fjelland et al. |
| 2010/0237116 A1 | 9/2010 | Hubbard |
| 2011/0084102 A1 | 4/2011 | Sautter et al. |
| 2011/0132946 A1 | 6/2011 | Sautter et al. |
| 2011/0174855 A1 | 7/2011 | Carothers et al. |
| 2011/0186608 A1 | 8/2011 | Sautter et al. |
| 2012/0111910 A1 | 5/2012 | Sautter et al. |
| 2012/0118926 A1 | 5/2012 | Elliot et al. |
| 2012/0145757 A1 | 6/2012 | Settelmayer et al. |
| 2012/0228349 A1 | 9/2012 | Sautter et al. |
| 2012/0292358 A1 | 11/2012 | Brej et al. |
| 2013/0043287 A1 | 2/2013 | Hubbard et al. |
| 2013/0105535 A1 | 5/2013 | Berrey |

(56) References Cited

U.S. PATENT DOCUMENTS

| | | | |
|---|---|---|---|
| 2013/0264366 A1 | 10/2013 | Hubbard et al. | |
| 2013/0284778 A1* | 10/2013 | Hubbard et al. | 224/282 |
| 2013/0292436 A1 | 11/2013 | Hubbard et al. | |

FOREIGN PATENT DOCUMENTS

| | | |
|---|---|---|
| CN | 102869543 A | 1/2013 |
| CN | 103118901 A | 5/2013 |
| DE | 2804588 A1 | 9/1979 |
| DE | 3128842 A1 | 2/1983 |
| DE | 3301769 A1 | 7/1984 |
| DE | 3618791 A1 | 12/1987 |
| DE | 3837209 C1 | 3/1990 |
| DE | 3817470 C2 | 3/1994 |
| DE | 4340019 C1 | 4/1995 |
| DE | 19526477 C1 | 9/1996 |
| DE | 19742253 C1 | 5/1999 |
| DE | 102004055557 A1 | 5/2006 |
| DE | 102006059975 A1 | 6/2008 |
| DE | 112011100482 T5 | 1/2013 |
| EP | 0422678 A1 | 4/1991 |
| EP | 0754595 A2 | 1/1997 |
| EP | 0852546 B1 | 8/2001 |
| EP | 1231112 A2 | 8/2002 |
| EP | 1284218 A1 | 2/2003 |
| EP | 0983903 B1 | 3/2004 |
| EP | 1190906 B1 | 2/2005 |
| EP | 2534010 A | 12/2012 |
| EP | 1592581 B1 | 5/2014 |
| FR | 2840571 A1 | 12/2003 |
| FR | 2880601 A1 | 7/2006 |
| GB | 2414459 B | 7/2006 |
| JP | 7172452 A | 7/1995 |
| JP | 8183396 A | 7/1996 |
| JP | 8258630 A | 10/1996 |
| JP | H10258687 A | 9/1998 |
| JP | 11291832 A | 10/1999 |
| JP | H11512676 A | 11/1999 |
| JP | 2004161170 A | 6/2004 |
| NZ | 417192 | 2/2013 |
| NZ | 417193 | 2/2013 |
| SE | 504606 C2 | 3/1997 |
| SU | 1770175 A1 | 10/1992 |
| WO | 9711864 A1 | 4/1997 |
| WO | 9711865 A1 | 4/1997 |
| WO | 2004067326 A2 | 8/2004 |
| WO | 2006115450 A1 | 11/2006 |
| WO | 2009038479 A1 | 3/2009 |
| WO | 2009038480 A1 | 3/2009 |
| WO | 2009158727 A1 | 12/2009 |
| WO | 2010030198 A1 | 3/2010 |
| WO | 2011078697 A1 | 6/2011 |
| WO | 2011084075 A1 | 7/2011 |
| WO | 2011094724 A1 | 8/2011 |
| WO | 2011096832 A1 | 8/2011 |
| WO | 2011145952 A1 | 11/2011 |
| WO | 2012008853 A1 | 1/2012 |
| WO | 2012033419 A1 | 3/2012 |
| WO | 2012154063 A2 | 11/2012 |

OTHER PUBLICATIONS

International Searching Authority of the Australian Patent Office regarding PCT Application No. PCT/NZ2011/000078, Second Written Opinion dated Nov. 8, 2011, 6 pages.
International Searching Authority of the Australian Patent Office regarding PCT Application No. PCT/NZ2011/000099, International Search Report and Written Opinion dated Dec. 6, 2011, 14 pages.
International Preliminary Examining Authority of the Australian Patent Office regarding PCT Application No. PCT/NZ2011/000078, International Preliminary Report on Patentability dated Dec. 16, 2011, 11 pages.
International Searching Authority of the Australian Patent Office regarding PCT Application No. PCT/NZ2011/000184 International Search Report and Written Opinion dated Feb. 14, 2012, 7 pages.
International Preliminary Examining Authority of the Australian Patent Office regarding PCT Application No. PCT/NZ2011/000184, International Preliminary Report on Patentability dated Aug. 31, 2012, 10 pages.
International Preliminary Examining Authority of the Australian Patent Office regarding PCT Application No. PCT/NZ2011/000099, International Preliminary Report on Patentability dated Dec. 10, 2012, 9 pages.
U.S. Patent and Trademark Office, Office action regarding U.S. Appl. No. 13/821,890, filed Oct. 17, 2013, 9 pages.
Canadian Intellectual Property Office, Office action regarding Canadian Patent Application No. 2,793,344 dated Nov. 1, 2013, 2 pages.
U.S. Patent and Trademark Office, Office action regarding U.S. Appl. No. 13/696,988, filed Nov. 7, 2013, 13 pages.
U.S. Patent and Trademark Office, Office action regarding U.S. Appl. No. 13/577,831, filed Mar. 14, 2014, 21 pages.
State Intellectual Property Office of Peoples Republic of China, Office action regarding Chinese Patent Application No. 201180008772.4, Jun. 16, 2014, 18 pages.
European Patent Office, Office action in European Patent Application No. EP11740097.8, Jun. 18, 2014, 4 pages.
State Intellectual Property Office of People's Republic of China, Office action regarding Chinese Patent Application No. 201180038270.6, Sep. 28, 2014, 16 pages.
The International Bureau of WIPO, International Search Report and Written Opinion of the International Searching Authority regarding PCT Application No. PCT/US2013/052787 dated Feb. 14, 2014, 10 pages.
The International Bureau of WIPO, International Preliminary Report on Patentability regarding PCT Application No. PCT/US2013/052787 mailed Feb. 12, 2015, 7 pages.
State Intellectual Property Office of People'S Republic of China, Office action regarding Chinese Patent Application No. 201180008772.4, Mar. 16, 2015, 7 pages.

* cited by examiner

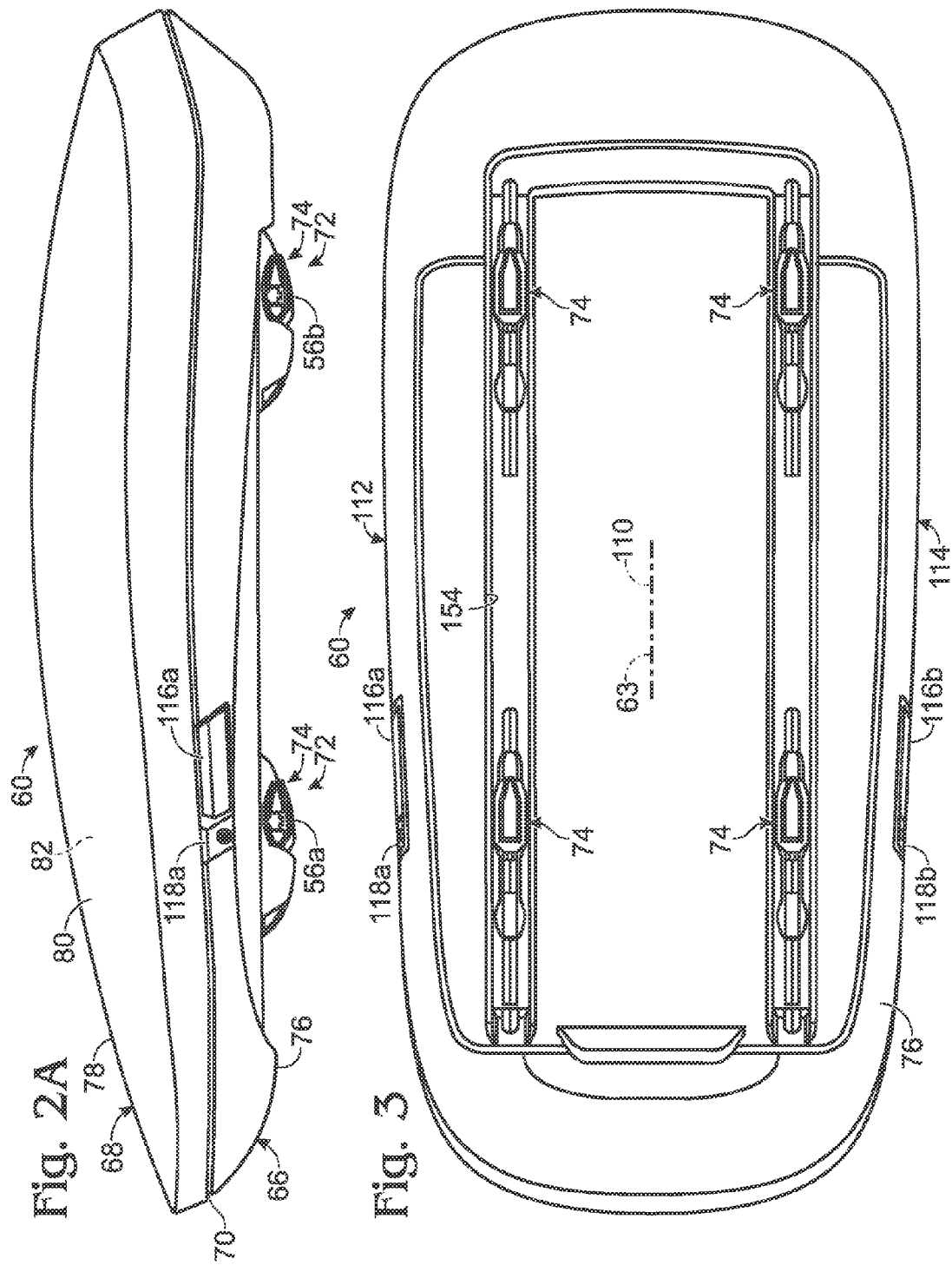

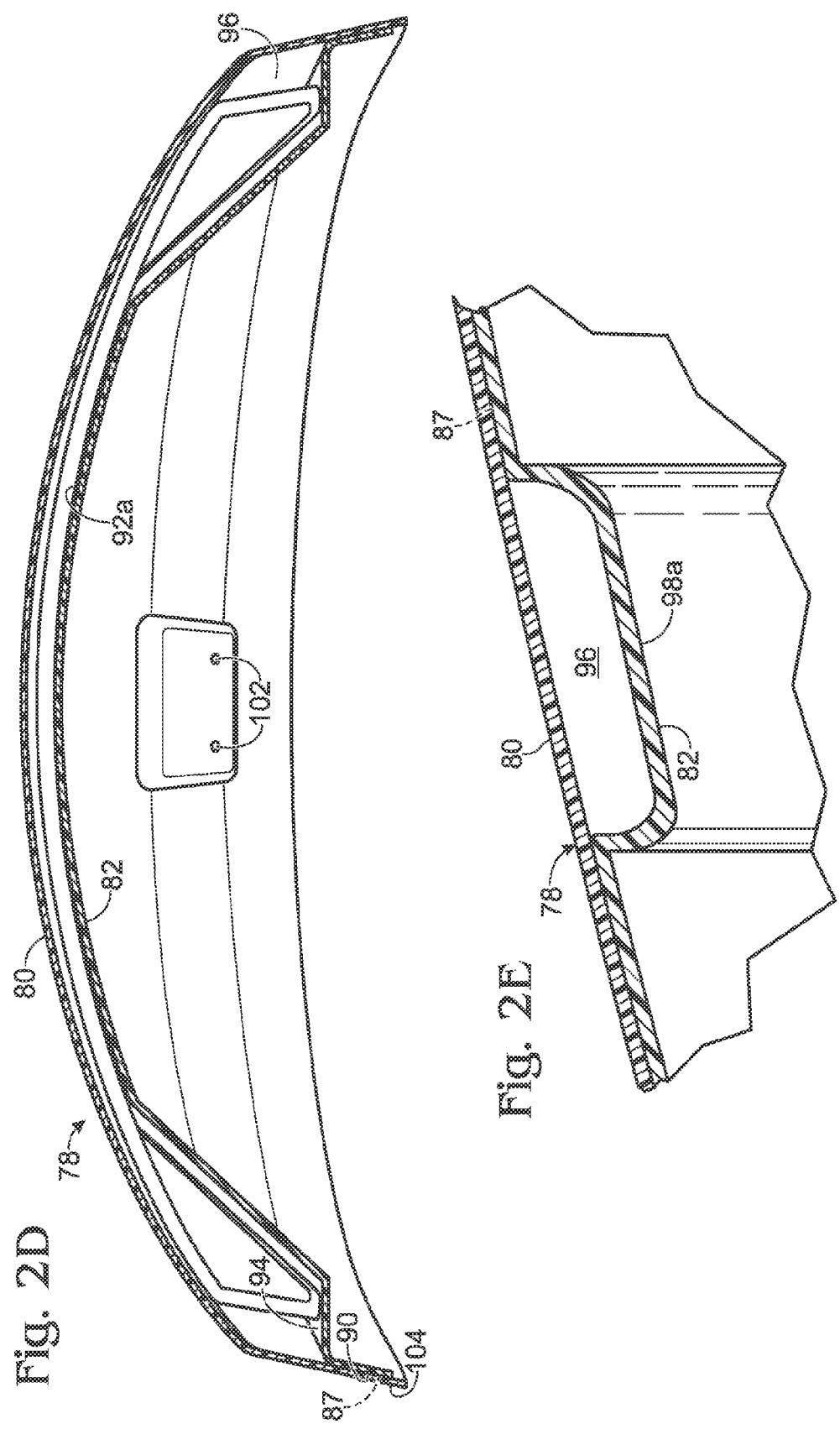

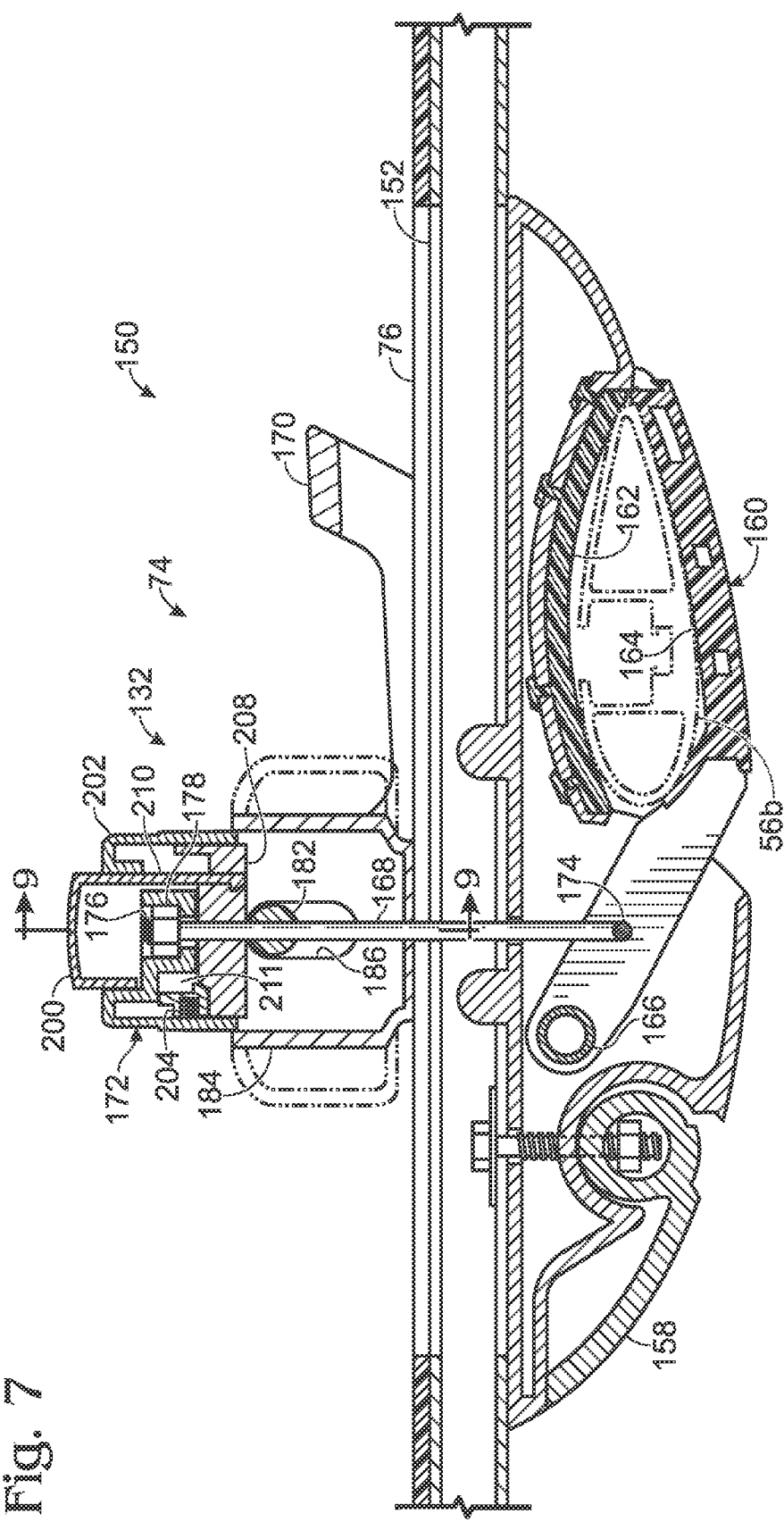

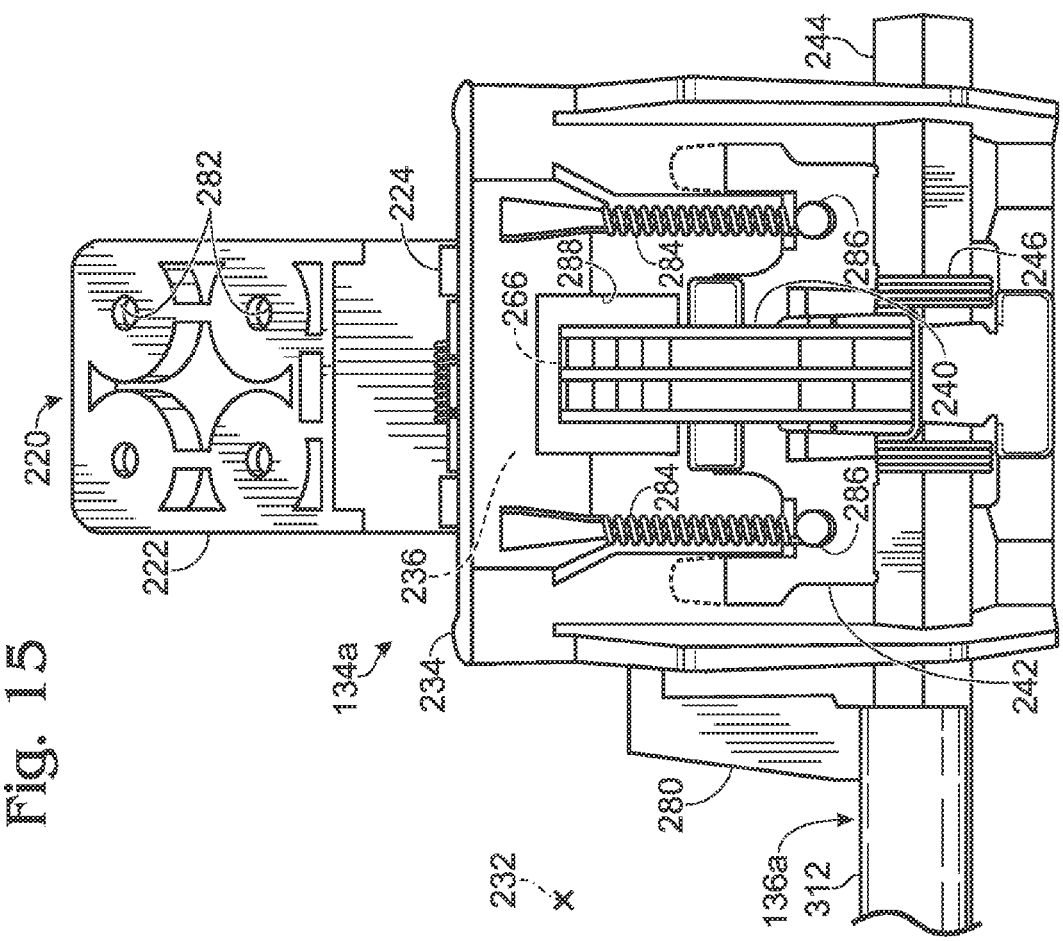
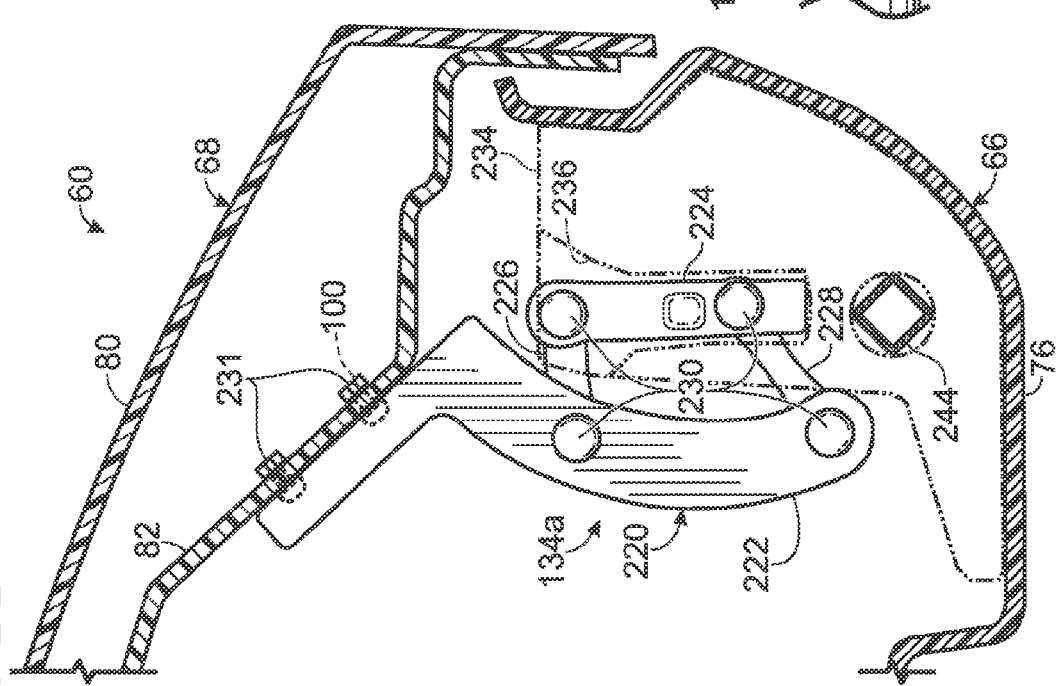

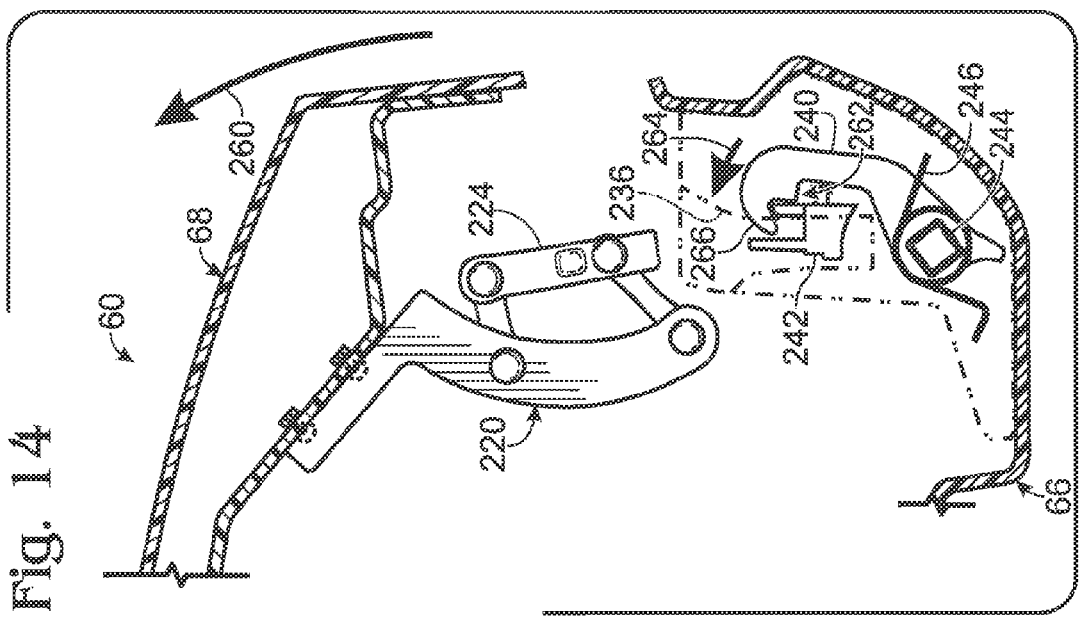
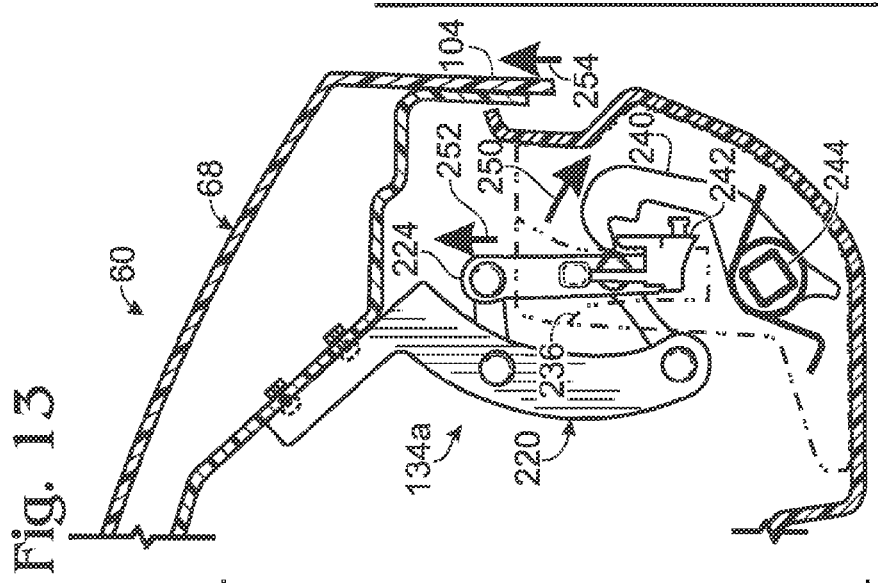
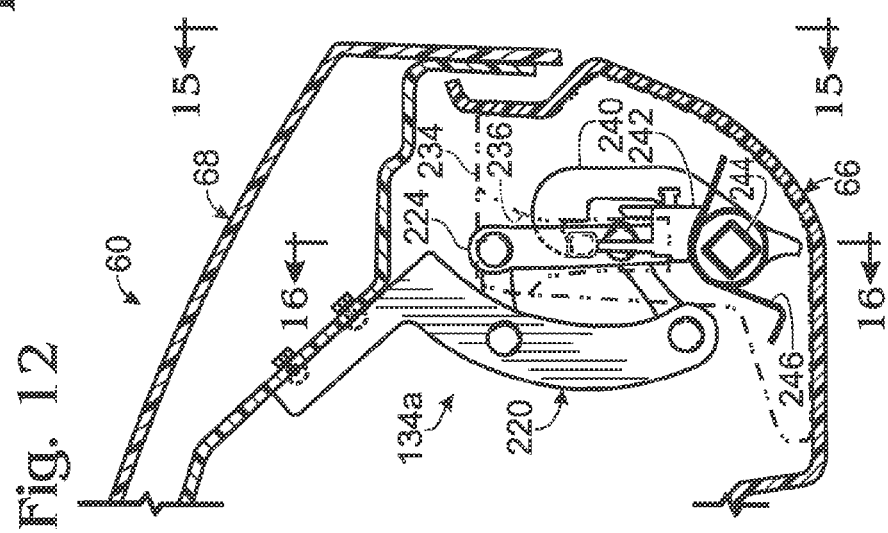

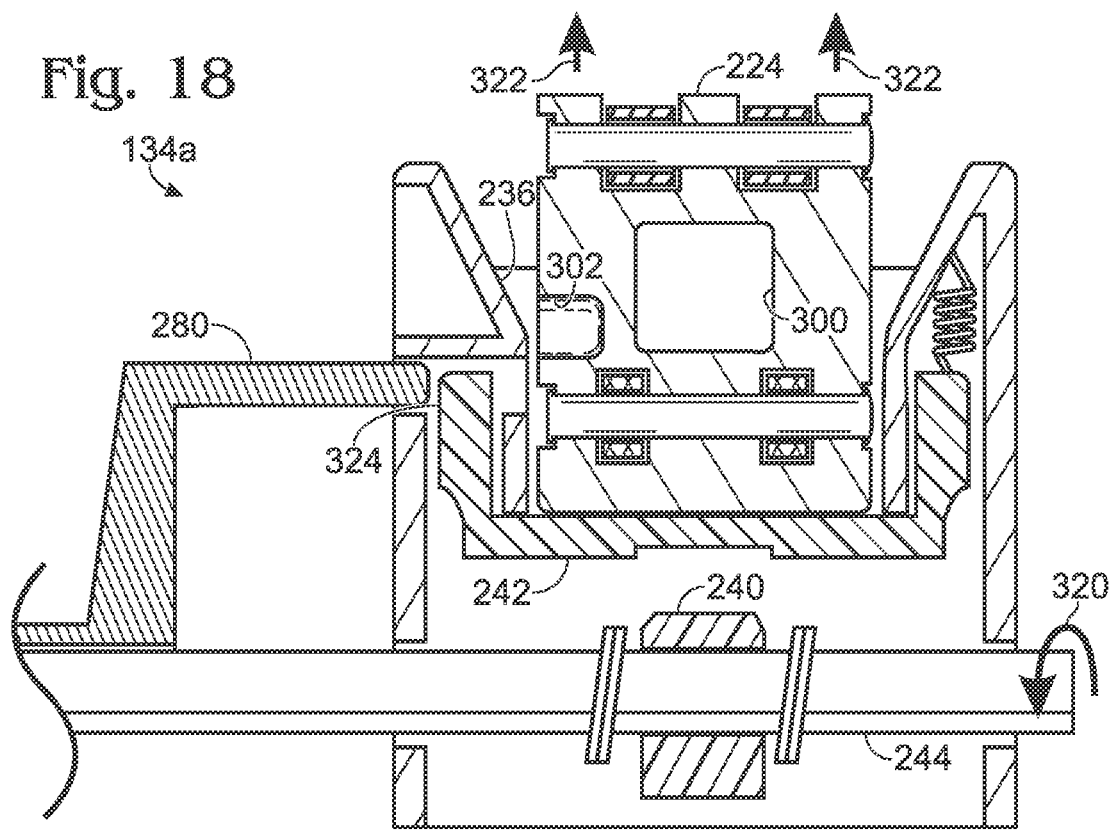

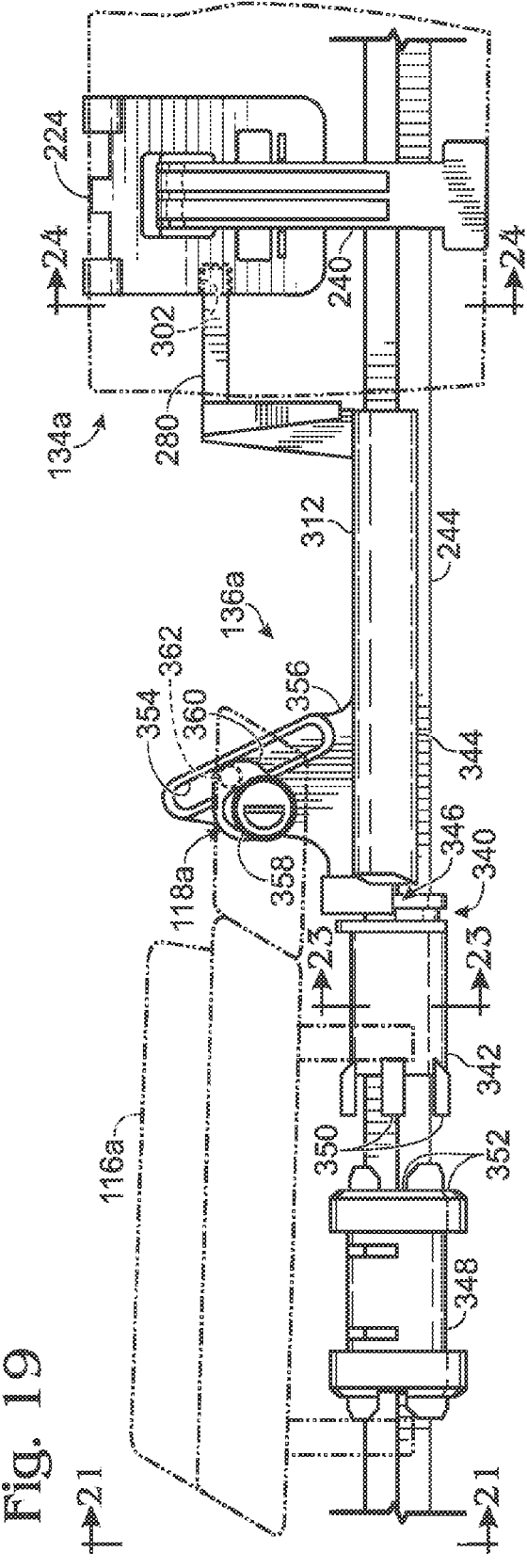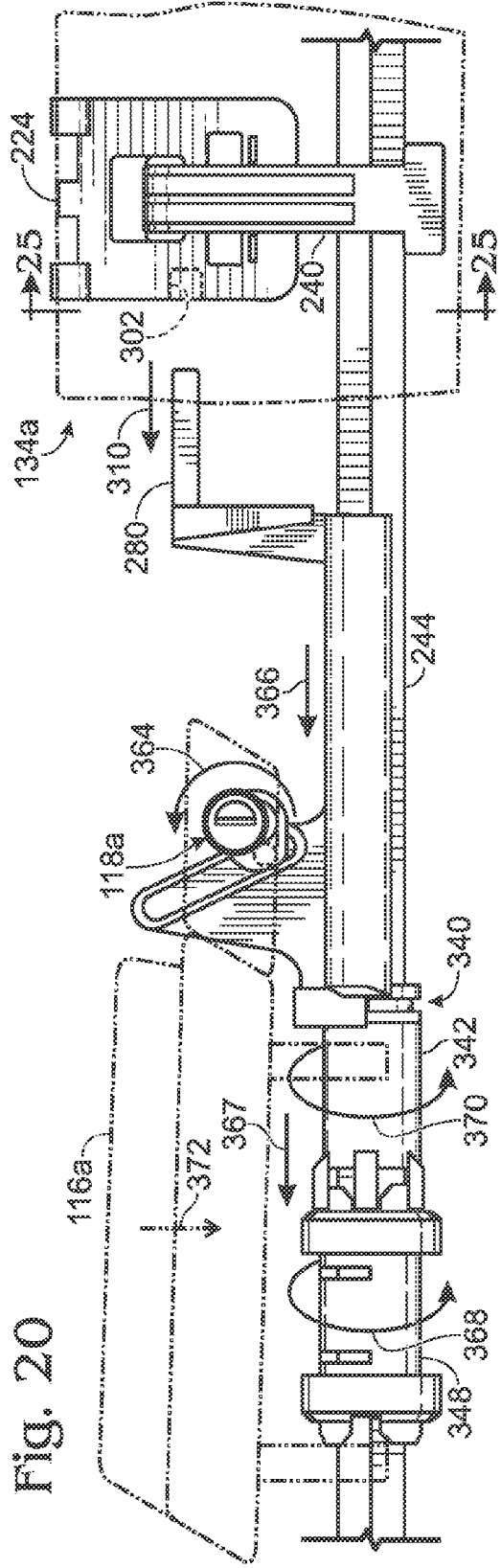

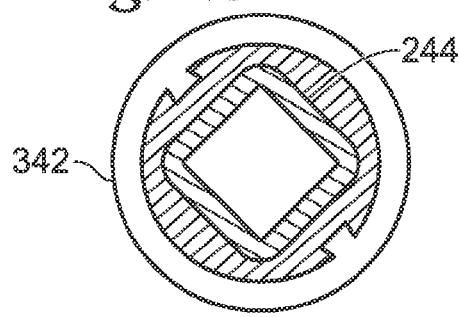
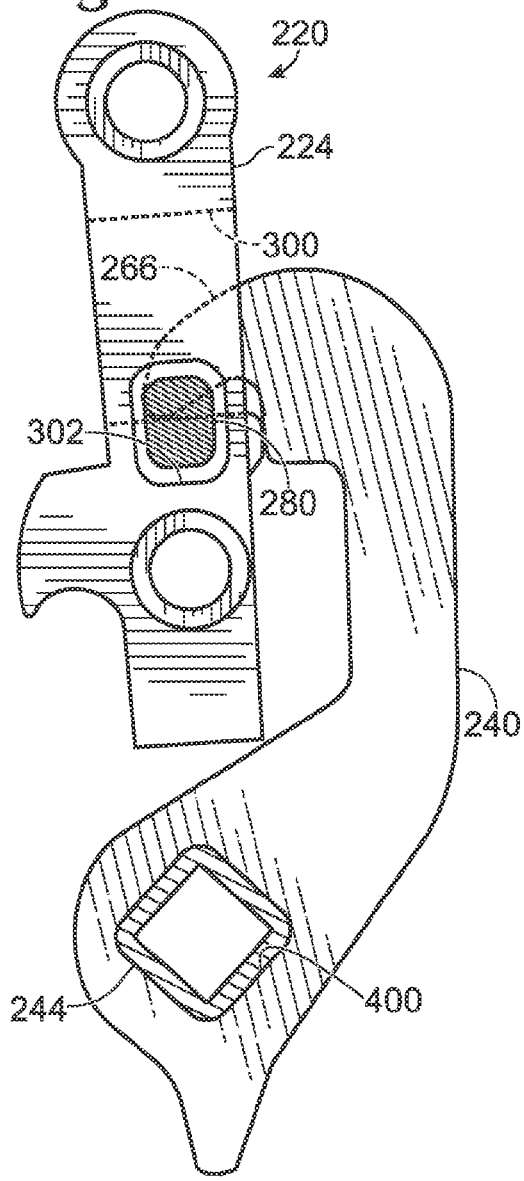
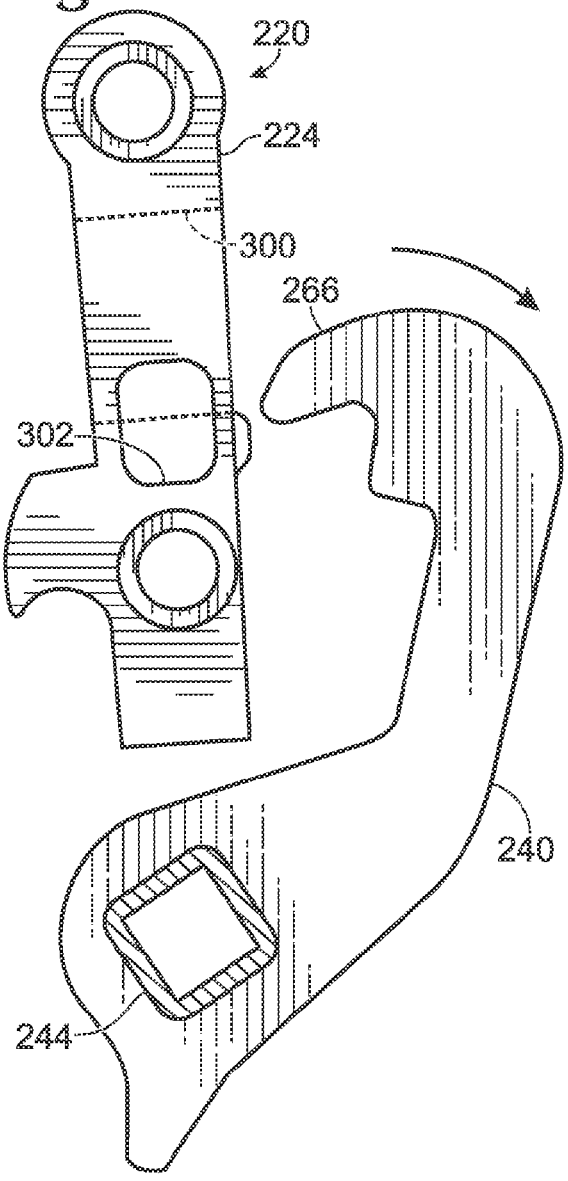

CARRIER FOR A VEHICLE

CROSS-REFERENCES TO PRIORITY APPLICATIONS

This application is based upon and claims the benefit under 35 U.S.C. §119(e) of U.S. Provisional Patent Application Ser. No. 61/677,424, filed Jul. 30, 2012; and U.S. Provisional Patent Application Ser. No. 61/699,137, filed Sep. 10, 2012. Each of these provisional patent applications is incorporated herein by reference in its entirety for all purposes.

CROSS-REFERENCES TO OTHER MATERIALS

This application incorporates herein by reference each of the following patent documents in its entirety for all purposes: U.S. Pat. No. 7,503,470; U.S. Pat. No. 7,740,157; U.S. Pat. No. 7,980,436; U.S. Patent Application Publication No. 2007/0194185; U.S. Patent Application Publication No. 2010/0084447; U.S. Patent Application Publication No. 2011/0132946 A1, published Jun. 9, 2011; U.S. Patent Application Publication No. 2013/0043287 A1, published Feb. 21, 2013; PCT Patent Application Publication No. WO 2011/145952 A1, published Nov. 4, 2011; and PCT Patent Application Publication No. WO 2012/008853 A1, published Jan. 19, 2012.

INTRODUCTION

Cargo boxes are vehicle top carriers that provide an enclosed storage space above the vehicle. As fuel becomes more expensive, vehicles become smaller and interior cargo space decreases, making the demand for reliable, easy-to-use top carriers even greater. Cargo boxes have become quite popular for carrying cargo and are often preferable over conventional open racks for a variety of reasons. For example, cargo boxes protect cargo from the elements, such as wind, rain, and snow, and are more secure from theft.

A system of latches may keep the cargo box closed. The latches may be located on both sides of the box, to allow the box to be opened from either side of the vehicle. However, the design of the latches often strikes a compromise between preventing a cargo box from opening accidentally while the vehicle is moving, particularly at high speed and/or through sharp turns, and permitting the cargo box to open easily and reliably when the user needs access.

The cargo box may be attached with clamps to crossbars that are mounted to the roof of a vehicle. If the clamps are not tightened sufficiently, the cargo box is not fixed in place and can slide on the crossbars during vehicle travel. More generally, clamps play various important roles in vehicle-mounted cargo carriers, not only to mount the carrier to a vehicle but also, for example, to attach cargo to the carrier.

SUMMARY

The present disclosure provides a carrier, such as a cargo box, for a vehicle. In an exemplary embodiment, the cargo box may comprise a bottom portion mountable to a vehicle, and a lid portion that fits together with the bottom portion to form a container for cargo. The container may have a pair of lateral sides opposite each other. The cargo box also may comprise a plurality of hinge-latch members to connect the lid portion to the bottom portion adjacent each lateral side. At least one hinge-latch member adjacent each lateral side may include a hinge, a first latch, and a second latch. The first and second latches may be adjustable individually to connect the lid portion to the bottom portion via the hinge. In another exemplary embodiment, the carrier may comprise a clamp device having a force indicator.

BRIEF DESCRIPTION OF THE DRAWINGS

FIG. 2A is an elevation of the left side of the cargo box of FIG. 1.

FIG. 2D is a cross-sectional view of the lid shell of FIG. 2B, taken generally along line 2D-2D of FIG. 2B with the upper shell layer present.

FIG. 2E is a fragmentary sectional view of the lid shell of FIG. 2C, taken generally around the region indicated at 2E in FIG. 2C.

FIG. 3 is a bottom plan view of the cargo box of FIG. 1.

FIG. 7 is a longitudinal sectional view of the clamp device of FIG. 6, taken generally along line 7-7 of FIG. 5 with the bottom shell of the cargo box present.

FIG. 11 is a fragmentary sectional view of selected aspects of the cargo box of FIG. 1, taken generally along line 11-11 of FIG. 4 toward a hinge, with the box closed.

FIG. 12 is a fragmentary sectional view of selected aspects of the cargo box of FIG. 1, taken generally as in FIG. 11 with the box closed, but showing additional components of a hinge-latch member that includes the hinge of FIG. 11.

FIG. 13 is another fragmentary sectional view of selected aspects of the cargo box of FIG. 1, taken generally as in FIG. 12, but with the box fully unlatched at the hinge-latch member, such that the lid portion is elevated by a hinge lifter of the hinge-latch member, before the lid portion is pivoted open by a user to access the inside of the box.

FIG. 14 is still another fragmentary sectional view of selected aspects of the cargo box of FIG. 1, taken generally as in FIG. 12, but with the lid portion of the box in the process of being pivoted away from the bottom portion by a user, to open the box on one of its lateral sides for access to the box interior.

FIG. 15 is a fragmentary side view of selected aspects of the cargo box of FIG. 1, taken generally along line 15-15 of FIG. 12 toward a hinge-latch member, in the absence of the upper and lower shells of the cargo box.

FIG. 18 is a sectional view of selected aspects of the cargo box of FIG. 1, taken generally as in FIG. 16, but with each of the latches moved to a respective unlatched configuration.

FIG. 19 is a fragmentary side view of selected aspects of the cargo box of FIG. 1, taken generally along line 19-19 of FIG. 4, in the absence of the upper and lower shells of the box, and toward a hinge-latch member and an actuation mechanism for adjustment of latches of the hinge-latch member, with the hinge-latch member in a double-latched configuration.

FIG. 20 is another fragmentary side view of selected aspects of the cargo box of FIG. 1, taken generally as in FIG. 19, but with the hinge-latch member in an unlatched configuration produced by adjustment of a locking mechanism and manipulation of an actuating member of the actuation mechanism.

FIG. 23 is a sectional view of selected aspects of the actuation mechanism of FIG. 19, taken generally along line 23-23 of FIG. 19 through a coupling member that couples manipulation of the actuating member of FIG. 21 to pivotal motion of the drive bar.

FIG. 24 is a fragmentary sectional view of selected aspects of the hinge-latch member of FIG. 19, taken generally along line 24-24 of FIG. 19.

FIG. 25 is another fragmentary sectional view of selected aspects of the hinge-latch member of FIG. 19, taken generally as in FIG. 24, but after each latch of the hinge-latch member has been adjusted to a respective unlatched configuration.

DETAILED DESCRIPTION

Figure 1:
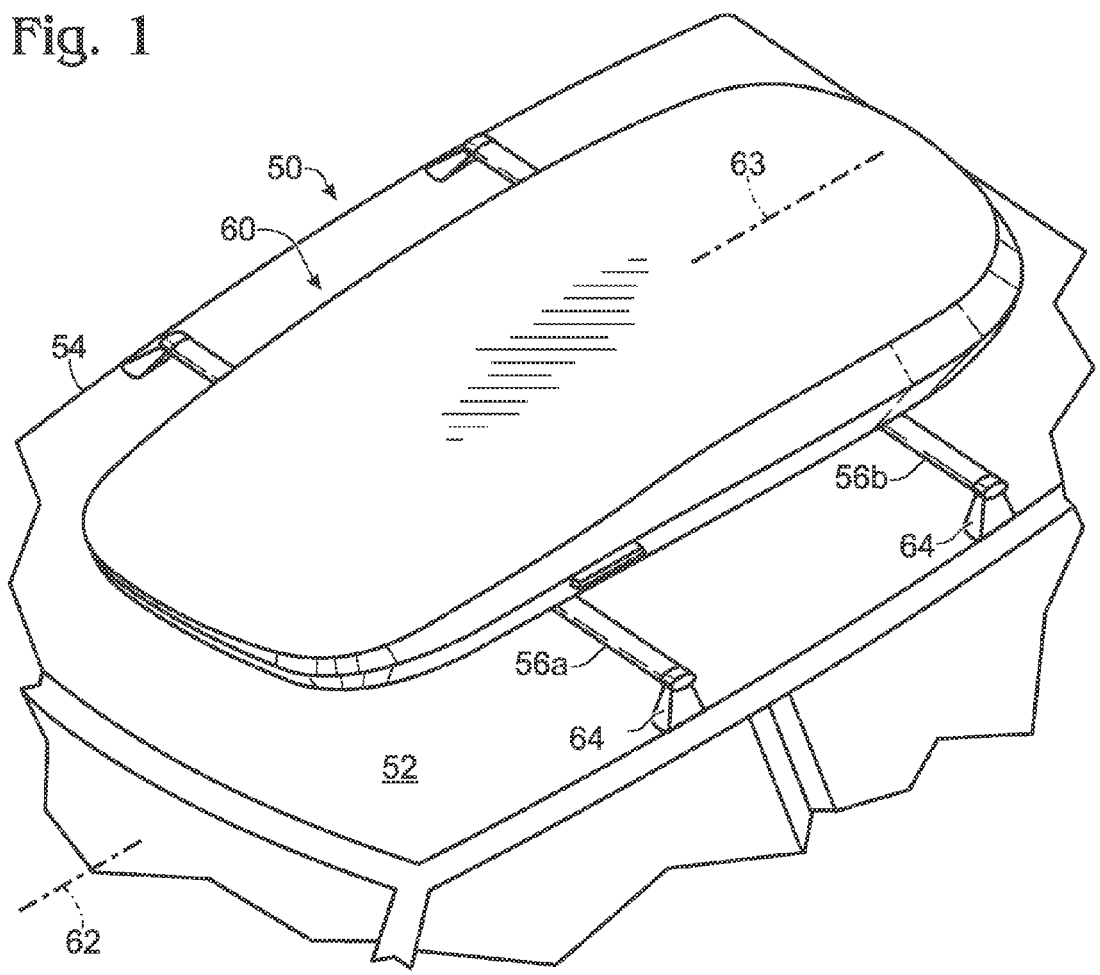
FIG. 1 is an isometric view of an exemplary cargo box mounted to a pair of crossbars above the roof of a vehicle, in accordance with aspects of the present disclosure.

The present disclosure provides a carrier, such as a cargo box, for a vehicle. In an exemplary embodiment, the cargo box may comprise a bottom portion mountable to a vehicle, and a lid portion that fits together with the bottom portion to form a container for cargo. The container may have a pair of lateral sides opposite each other. The cargo box also may comprise a plurality of hinge-latch members to connect the lid portion to the bottom portion adjacent each lateral side. At least one hinge-latch member adjacent each lateral side may include a hinge, a first latch, and a second latch. The first and second latches may be adjustable individually to connect the lid portion to the bottom portion via the hinge. In another exemplary embodiment, the carrier may comprise a clamp device having a force indicator. By indicating the clamp force through a force indicator, the cargo box can be clamped within an acceptable range of tightness.

An exemplary cargo box is provided. The cargo box may comprise a bottom portion, a lid portion, and an actuating member. The cargo box also may comprise a plurality of hinge-latch members to connect the lid portion to the bottom portion. At least one of the plurality of hinge-latch members may include a hinge, a first latch, and a second latch. The first latch may be adjustable between a latched configuration (also termed a retaining configuration) and an unlatched configuration (also termed a released or retracted configuration) by manipulation of the actuating member when the second latch is in an unlatched configuration but not when the second latch is in a latched configuration. The second latch may be adjusted between latched and unlatched configurations with a locking mechanism operated by a removable key. In other words, the first latch may be released when the locking mechanism is in an unlocked configuration but not when the locking mechanism is in a locked configuration. The actuating member may include a graspable lever. In some embodiments, the first latch and the second latch may move in respective directions that are transverse to each other when each latch is adjusted from an unlatched configuration to a latched configuration of the latch. The first latch may be a hook latch and the second latch a pin latch, among others.

Another exemplary cargo box is provided. The cargo box may comprise a bottom portion and a lid portion that fit together to form a container for cargo, with the container having a pair of lateral sides opposite each other. The cargo box also may comprise a pair of hinge-latch members to connect the lid portion to the bottom portion on one of the lateral sides. Each of the pair of hinge-latch members may include a hinge and a latch. The hinge may include a first hinge member and a second hinge member that remain pivotally connected to each other within the hinge when the container is opened on the one lateral side. The first hinge member may define an aperture that receives at least a portion of the latch to produce a latched configuration that secures the lid portion to the bottom portion at the hinge. The cargo box further may comprise a bar pivotally connected to the container and operatively connected to the latch of each of the pair of hinge-latch members such that pivotal motion of the bar moves each of the latches from a latched configuration to an unlatched configuration.

Still another exemplary cargo box is provided. The cargo box may comprise a bottom portion and a lid portion that fit together to form a container for cargo, with the container having a front end opposite a back end, and a pair of lateral sides opposite each other. A hinge may be connected to the container adjacent one of the lateral sides. The hinge may include a first hinge member and a second hinge member. The hinge members may remain pivotally connected to each other within the hinge when the container is opened on the one lateral side. A latch may be adjustable from an unlatched configuration to a latched configuration by movement of the latch closer to the front end or the back end of the container, with the latched configuration securing the lid portion to the bottom portion at the hinge.

A carrier mountable to an exterior of a vehicle is provided. The carrier may comprise a clamp device including a gripping portion having a pair of jaws and also including an adjustment member that is rotatable as a unit to adjust a distance between the jaws. The adjustment member may be a graspable adjustment knob including a body and an indicator that exhibit a change in relative position when force associated with the clamp device exceeds a threshold. The gripping portion may be configured to grip a crossbar mounted to a vehicle, a rail attached to a vehicle, a portion of a vehicle, an article of cargo, or the like. In some embodiments, the clamp device may be part of a cargo box.

An exemplary method of attaching a carrier to a crossbar, a vehicle rail, a vehicle, or an article of cargo is provided. In the method, a portion of a crossbar, a vehicle rail, a vehicle, or an article of cargo may be disposed between jaws of a clamp device. An adjustment member may be rotated as a unit to adjust a distance between the jaws. The adjustment member may have a body and an indicator having a relative position with respect one another. The portion may be gripped with the jaws such that the relative position changes visibly.

Further aspects of the present disclosure are presented in the following sections: (I) cargo box overview, (II) clamp device with a force indicator, (III) exemplary latching system for a cargo box, and (IV) selected embodiments.

I. CARGO BOX OVERVIEW

This section provides an overview of an exemplary cargo box; see FIGS. 1-4.

FIG. 1 shows an exemplary carrier system 50 attached to an exterior (roof 52) of a vehicle 54. System 50 may include a pair of crossbars 56a and 56b and a cargo box 60 mounted to the crossbars above the vehicle.

Vehicle 54 defines a longitudinal axis 62 extending through a front and a rear of the vehicle and corresponding to the vehicle's travel direction. Cargo box 60 may define a long axis 63 arranged at least substantially parallel to the longitudinal axis of the vehicle.

Each crossbar may extend transversely, such as substantially orthogonally, to vehicle longitudinal axis 62, to provide a front crossbar 56a and a rear crossbar 56b. Crossbars 56a and 56b may be mounted to the vehicle with towers 64 (interchangeably termed feet), which each may, for example, engage a crossbar and the vehicle and/or a longitudinally extending rail secured to the vehicle's roof.

FIG. 2A shows a left side view of cargo box 60. The box may include a bottom portion 66 (interchangeably termed a base or a tub portion) and a lid portion 68 (interchangeably termed a lid or a top portion) that fit together to form a container (interchangeably termed an enclosure) to hold cargo.

Cargo box 60 is shown in FIG. 2A in a closed configuration. Bottom portion 66 and lid portion 68 in the closed configuration may define a seam 70 at which the bottom portion and lid portion meet each other. The seam may be planar or nonplanar. Furthermore, the seam may be flush on the exterior of the box, that is, the bottom portion and the lid portion may be flush with one another on the box exterior.

Bottom portion 66 may include a plurality of mounting assemblies 72 (interchangeably termed mounts) for attaching the cargo box to a vehicle, such as via crossbars 56a and 56b. Each mounting assembly may include a clamp device 74 to grip one of the crossbars, as described in more detail below.

Each of bottom portion 66 and lid portion 68 provides a respective shell 76 and 78 that forms a majority of the inner and outer surface area of the bottom portion or lid portion. Each shell may be composed of a single layer (interchangeably termed a single skin) or at least a pair of layers (interchangeably termed a double skin). In the depicted embodiment, bottom shell 76 includes a single skin or casing, and lid shell 78 includes a pair of skins or casings, namely, an outer or upper shell layer 80 and an inner or lower shell layer 82. In other embodiments, each of the bottom portion and the lid portion may have a single shell layer, the bottom portion may have at least a pair of shell layers and the lid portion a single shell layer or at least a pair of shell layers. Each shell and shell layer may be formed of a polymer, such as a rigid and/or hard plastic material, among others. The shell or shell layer may define one or more ribs to increase the rigidity and/or strength of the shell or shell layer.

Figure 2B:
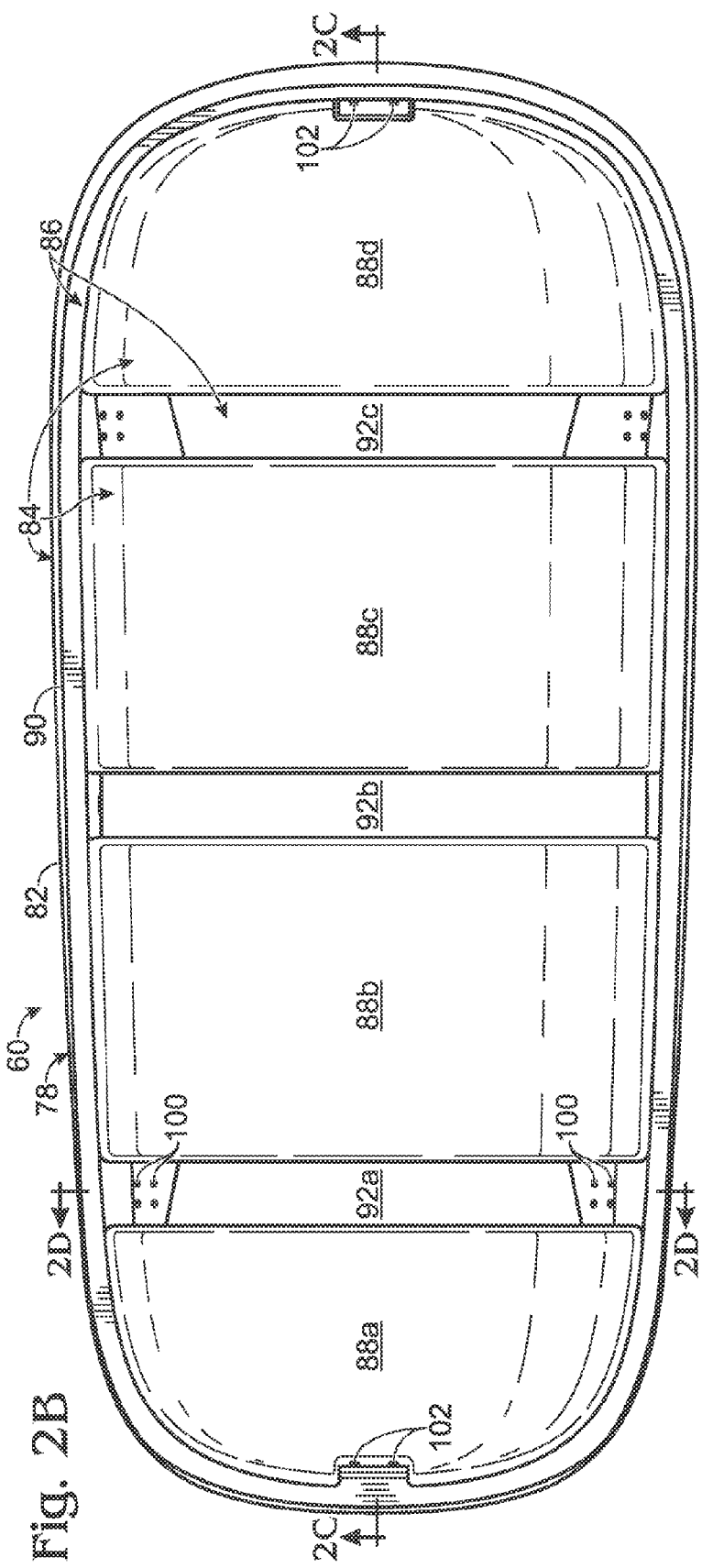
FIG. 2B is a top plan view of the lid shell of the cargo box of FIG. 1, taken with an upper shell layer of the lid shell removed.
Figure 2C:
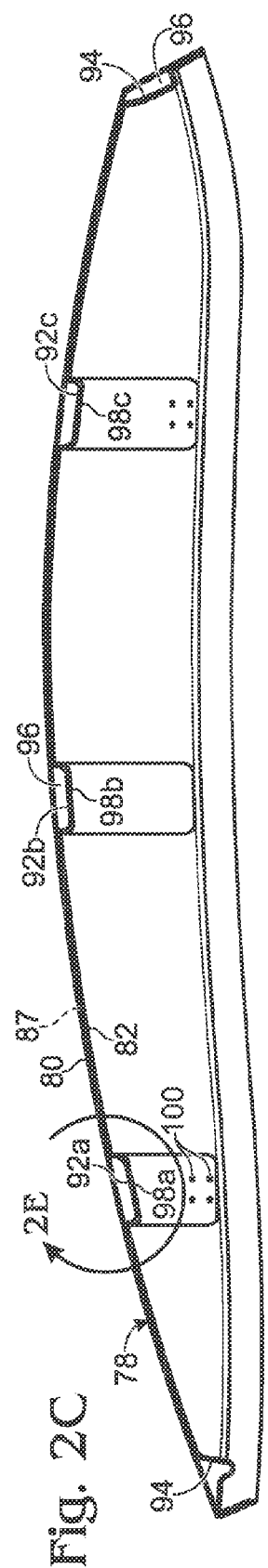
FIG. 2C is a longitudinal sectional view of the lid shell of FIG. 2B, taken generally along line 2C-2C of FIG. 2B with the upper shell layer present.

FIGS. 2B to 2E show various views of lid shell 78. FIG. 2B shows a top plan view of lid shell 78, with upper shell layer 80 removed (compare with FIGS. 1 and 2A). FIG. 2C shows a longitudinal sectional view of lid shell 78. FIG. 2D shows a transverse sectional view of lid shell 78. FIG. 2E shows a magnified portion of the view of FIG. 2C. Lower shell layer 82 may have a contacting portion 84 and a spaced portion 86 (see FIG. 2B).

Contacting portion 84 may closely match the contour of upper shell layer 80, to permit the contacting portion to contact or at least closely appose the upper shell layer for attachment, such as with an adhesive 87. The contacting portion may include a plurality of abutment regions 88a-88d arranged along the lid portion, and an abutment perimeter 90 that contacts a corresponding perimeter region of the upper shell layer (see FIGS. 2B and 2D).

Spaced portion 86 may define one or more traverse recesses 92a-c and/or a perimeter recess 94, among others (see FIGS. 2B to 2E). The recesses may or may not communicate with one another in the assembled lid shell. Also, the recesses may form regions of lower shell layer 82 that are spaced from upper shell layer 80 in the lid shell, to define at least one lid cavity 96 between shell layers 80 and 82. The lid cavity may include a perimeter cavity, which may extend at least substantially completely around the perimeter of the lid portion, and a plurality of transverse cavities, which may or may not communicate with one another and the perimeter cavity. The lower shell layer may define ribs 98a-98c on the bottom side of the layer (see FIGS. 2C to 2E).

The lower shell layer may define a plurality of apertures (see FIGS. 2B to 2D). For example, lower shell layer 82 may define apertures 100 at opposite ends of each recess 92a-c for attachment of hinges, as will be described in more detail below. The lower shell layer also may define additional apertures 102, such as at front and back ends of the layer. Accordingly, any suitable components of the cargo box that may be at least partially internal to the box, such as hinges and struts, may be attached to the lid shell with fasteners that extend through and/or engage lower shell layer 82, but not upper shell layer 80. As a result, upper shell layer 80 may remain substantially aperture free, and may have no fasteners or other hardware projecting from the outer side of the upper shell layer, which can make the lid portion more leak-resistant, stronger, and/or attractive. In some embodiments, bottom shell 76 also or alternatively may have upper and lower shell layers, and one or more components of the cargo box (such as hinges, latches, struts, clamps, actuators, etc.) may be attached to the upper shell layer of the bottom shell.

Lid shell 78 may form a lip 104 at its perimeter (see FIG. 2D). Upper shell layer 80 and lower shell layer 82 may be offset from each other (or flush) at the bottom of the lip. For example, in the depicted embodiment, upper shell layer 80 projects below the bottom end of lower shell layer 82, such that lip 104 has a single-layered portion disposed below and projecting from a double-layered portion. Further aspects of shell structure that may be suitable for the cargo box are described in the patent documents listed above under Cross-References, which are incorporated herein by reference, particularly U.S. Patent Application Publication No. 2013/0043287 A1, published Feb. 21, 2013.

FIG. 3 shows a bottom plan view of cargo box 60. The cargo box, both inside and outside, may have reflectional symmetry about a central vertical plane 110 containing long axis 63 and extending through the front end and the back end of the cargo box. For example, the cargo box may have two pairs of clamp devices 74, with one pair disposed on each side of central vertical plane 110. Each clamp device may be adjustably positionable along a line parallel to long axis 63, as described in further detail below, to accommodate different separation distances of crossbars 56a and 56b from each other (also see FIGS. 1 and 2A).

The cargo box may have a pair of lateral sides 112 and 114 formed between the front end and the back end of the box, and generally between the top and bottom sides of the box. Cargo box 60 may be openable interchangeably on each lateral side 112 and 114. More particularly, the cargo box may have actuating members 116a and 116b positioned on respective lateral sides 112 and 114 and each configured to be manipulated individually by a user, while the box is closed, to unlatch the box for opening on the corresponding lateral side. Actuating members 116a and 116b may be flush with the exterior of upper shell 78 and/or lower shell 76. Also, the cargo box may be locked individually on each lateral side 112 and 114, with respective locking mechanisms 118a and 118b, each of which may be operated individually with a same removable key. Each locking mechanism may be adjustable between an unlocked configuration and a locked configuration. In the unlocked configuration, manipulation of associated actuating member 116a or 116b can unlatch the box on the corresponding lateral side. In the locked configuration, manipulation of actuating member 116a or 116b may be permitted but fails to unlatch the box on the corresponding lateral side. Each locking mechanism 118a or 118b may be adjacent a corresponding actuating member 116a or 116b, such as arranged forward (as shown here) or rearward from the actuating member.

Figure 4:
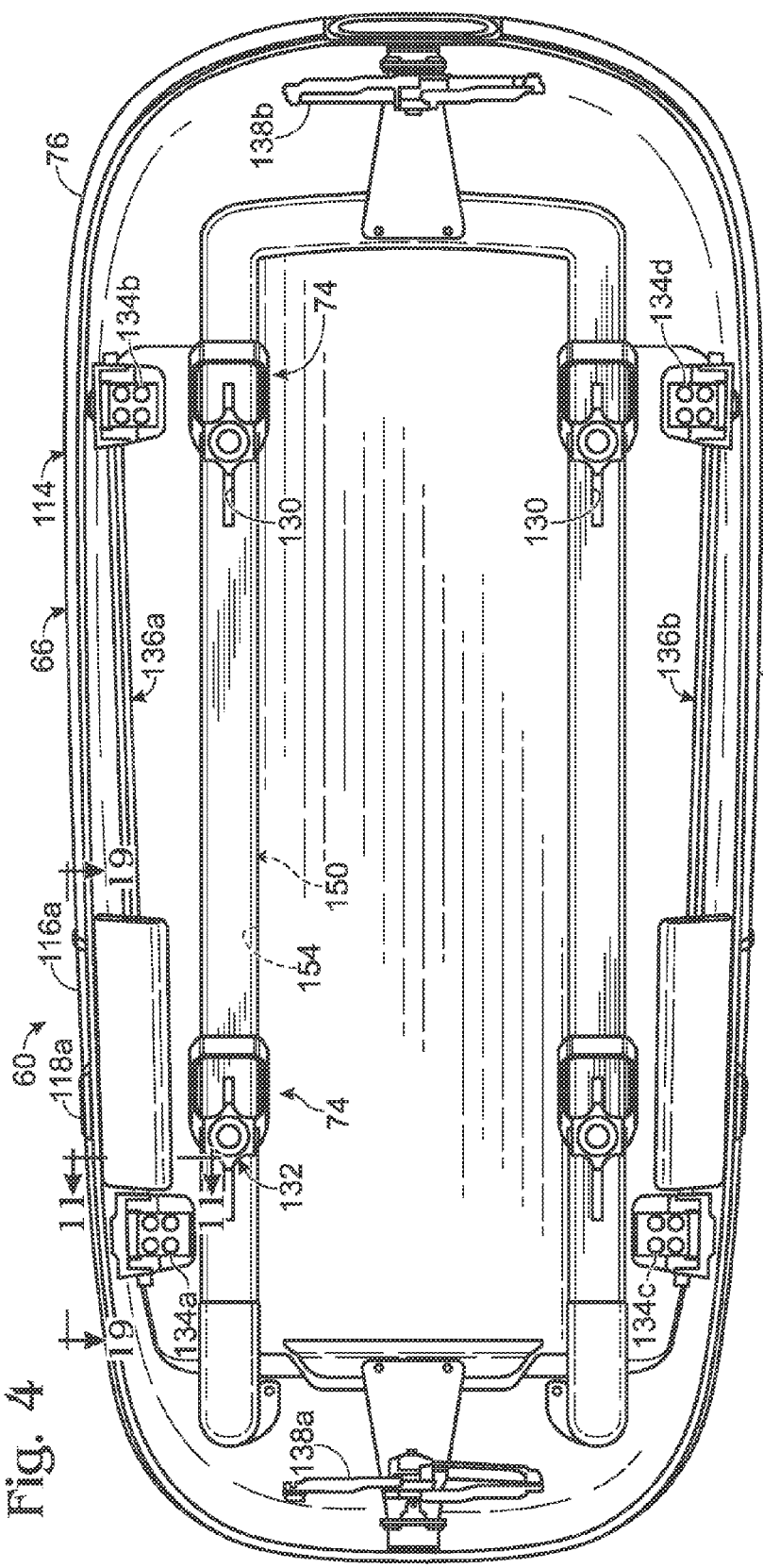
FIG. 4 is a top plan view of the cargo box of FIG. 1, taken in the absence of the lid shell of the cargo box.

FIG. 4 shows a top plan view of cargo box 60, taken in the absence of the lid shell. Clamp devices 74 may extend through slots 130 defined by bottom shell 76, which allows the clamp devices to be slideably repositioned along each slot. An adjustment mechanism 132 of each clamp device may be accessible to the user inside the box, to adjust a distance between the jaws of the clamp device. In other embodiments, the adjustment mechanism may be disposed outside the container formed by the upper and lower shells of the box.

The cargo box may have at least one or at least a pair of hinge-latch members arranged adjacent each lateral side of the cargo box. For example, in the depicted embodiment, hinge-latch members 134a and 134b are disposed adjacent lateral side 114, and hinge-latch members 134c and 134d adjacent lateral side 112. Each hinge-latch member provides a latchable and unlatchable (releasable) point of connection between bottom shell 76 and lid shell 78 of the box. Any suitable portion or all of the hinge-latch member may remain attached to lid shell 78 of lid portion 68 (or bottom shell 76 of bottom portion 66) when the box is unlatched and opened at the hinge-latch member, as described in more detail below.

The cargo box may have an actuation mechanism 136a or 136b for the hinge-latch members adjacent each lateral side of the box. Actuation mechanism 136a may be adjustable to produce latched/unlatched configurations of hinge-latch members 134a and 134b adjacent lateral side 114, and actuation mechanism 136b may be adjustable to produce latched/unlatched configurations of hinge-latch members 134c and 134d adjacent lateral side 112. Each actuation mechanism 136a or 136b may include (and/or may be operatively connected to) actuating member 116a or 116b and locking mechanism 118a or 118b.

The cargo box may have one or more lid supports that support the lid portion in an open configuration of the box. For example, the depicted embodiment has a pair of struts 138a and 138b positioned inside the container respectively adjacent the front end and the back end of the cargo box. Each strut may connect bottom portion 66 to lid portion 68 and may have a collapsed configuration when the box is closed and an extended or expanded configuration when the box is open. The lower end of the strut may be connected to bottom portion 66, and the upper end to lid portion 68 via one or more fasteners disposed in apertures 102 (also see FIGS. 2B and 2D).

II. CLAMP DEVICE WITH A FORCE INDICATOR

This section describes an exemplary clamp device 74 forming part of cargo box 60 of Section I and having a force indicator; see FIGS. 5-10. The clamp device may be utilized by other types of vehicle-mountable carriers, for the same purpose or a different purpose(s).

Figure 5:
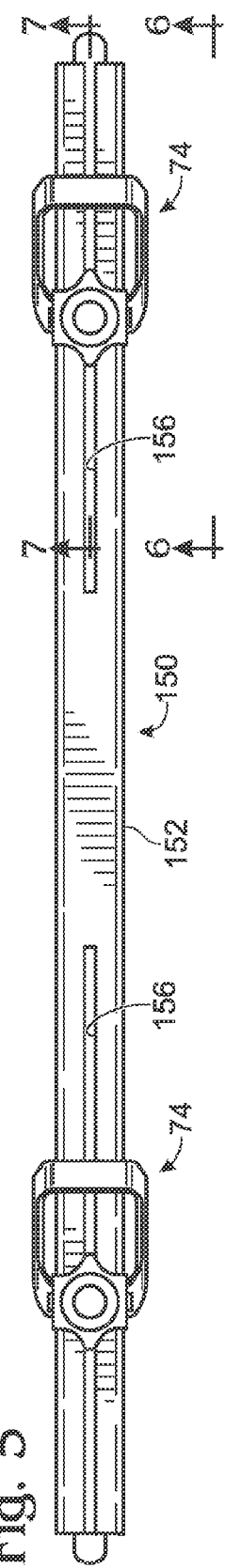
FIG. 5 is a top plan view of a track assembly from the bottom portion of the cargo box of FIG. 1, with the track assembly including a pair of clamp devices and viewed in isolation from the bottom shell of the cargo box.

FIG. 5 shows a top plan view of a track assembly 150 including a pair of clamp devices 74 (also see FIG. 4). The track assembly may include a frame member 152 (interchangeably termed a rail member) that is received in and attached to bottom shell 76, with the frame member disposed in a channel 154 defined by the underside of the bottom shell (also see FIG. 3). The frame member may be hollow (e.g., a tube) and may define a respective slot 156 for travel of each clamp device 74 longitudinally with respect to the cargo box. The slot may permit a portion of the clamp device to extend through the frame member from a top side to a bottom side of the frame member. Each slot 156 of the frame member may be coplanar with a corresponding slot 130 defined by bottom shell 76, such that slots 156 of the track assembly are each aligned with a slot 130 of the bottom shell, for longitudinal repositioning of each clamp device along a pair of aligned slots 130 and 156.

Figure 6:
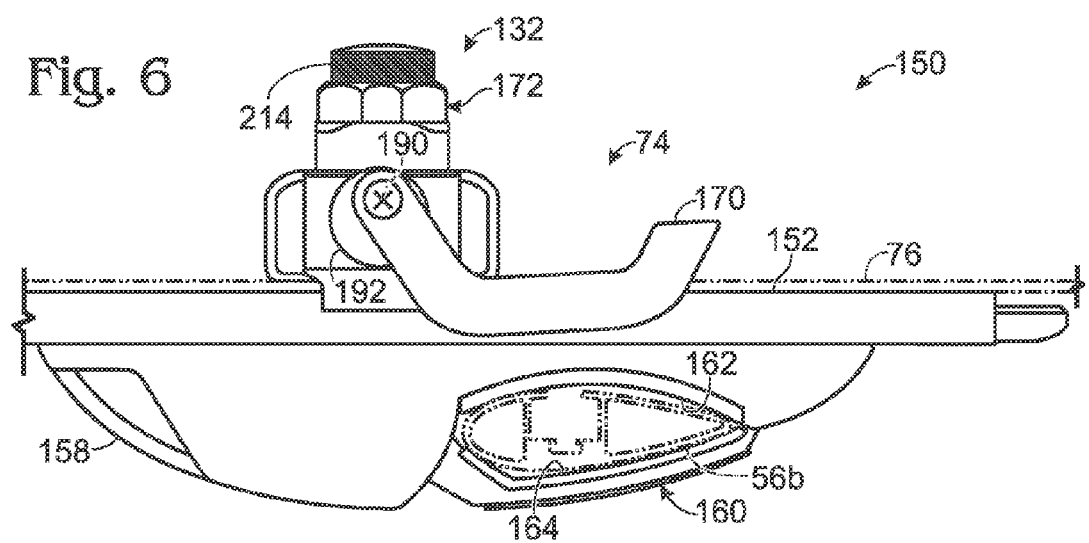
FIG. 6 is a fragmentary elevation of the track assembly of FIG. 5, taken generally along line 6-6 of FIG. 5 toward one of the clamp devices.

FIGS. 6 and 7 respectively show a fragmentary side view and a fragmentary sectional view of track assembly 150 taken toward or through one of clamp devices 74. Clamp device 74 may include a lever 158 that is pivotable between a securing configuration and a released configuration. In the securing configuration, the clamp device is fixed at a selected position along slots 130 and 156. In the released configuration, the clamp device is slideable along the slots to a new position. The clamp device also may have a gripping portion 160 disposed below frame member 152 (and bottom shell 76). The gripping portion may be configured to receive a region of a crossbar between a pair of gripping regions formed by a pair of jaws, such as a fixed jaw 162 and a movable jaw 164 (which may be termed a bail). The distance between the jaws (i.e., the distance between the gripping regions of the jaws) may, for example, be adjusted by moving jaw 164 while jaw 162 remains stationary with respect to bottom shell 76. Jaw 164 may be pivotably connected, indicated at 166, to a base portion of clamp device 74 forming fixed jaw 162 (see FIG. 7).

The distance between the jaws may be adjusted with clamp adjustment mechanism 132. The clamp adjustment mechanism may include a link member 168 operatively connecting movable jaw 164 to a coarse adjustment member 170 (interchangeably termed a lever or an actuator) and a fine adjustment member 172 (interchangeably termed a rotatable member or knob member). Manipulation of each adjustment member may adjust the position of movable jaw 164, to change a distance between the jaws. Link member 168 may be pivotably connected to jaw 164, indicated at 174, such that tension applied to the link member urges jaw 164 to pivot toward the fixed jaw (counterclockwise in FIG. 7). The link member, which in some cases may be described as a threaded rod or a bolt, may have a threaded portion 176 for threaded engagement with a threaded member 178 (e.g., a nut) of fine adjustment member 172. Accordingly, rotation of fine adjustment member 172 can adjust the position of the adjustment member along link member 168, to continuously change the current tension (and/or the prospective tension) on link member 168, the distance between the jaws of the clamp device, and the clamping force exerted by the gripping portion of the clamp device.

Coarse adjustment member 170 may be configured to be manipulated to open and close the clamp device. For example, coarse adjustment member 170 can be configured to be pivoted about one-half turn (i.e., flipped) to introduce a relatively large change in the distance between the jaws and/or the tension on link member 168 and/or the clamp device. In some cases, after fine adjustment member 172 is properly adjusted, coarse adjustment member 170 has a first position (about one-half turn from that shown in FIGS. 6 and 7) in which the gripping portion is open to receive a portion of the crossbar (or other grippable member), or to permit removal of the portion of the crossbar (or other grippable member) from the clamp device. The coarse adjustment member also may have a second position (shown in FIGS. 6 and 7) in which the jaws of the clamp device grip the portion of the crossbar (or other grippable member) to anchor the cargo box to the vehicle (or attach the grippable member to the clamp device). In some embodiments, the change in distance between the jaws of the clamp device for about one-half turn or less of the coarse adjustment member may be greater than the change in the distance between the jaws produced by one or at least two full turns of fine adjustment member 172.

Coarse adjustment member 170 may be manipulable to adjust the position of a support bar 182 with respect to a housing 184 positioned under fine adjustment member 172. Housing 184 may define a pair of openings 186 elongated parallel to link member 168 and sized to receive opposite ends of support bar 182. Accordingly, support bar 182 can travel vertically in housing 184, parallel to link member 168. Coarse adjustment member 170 may be pivotally connected to housing 184 and arranged to pivot about a central long axis 190 of support bar 182 (see FIGS. 6 and 8). The coarse adjustment member may have a cam region 192 arranged eccentrically with respect to axis 190 of support bar 182 and configured to bear against a ledge 193 formed by housing 184 (see FIGS. 8 and 9). As a result, pivoting coarse adjustment member 170 through its full range of motion moves support bar 182 between the top end and the bottom end of openings 186. Support bar 182 may be engaged with fine adjustment member 172, which may be attached to the upper end of link member 168. Raising the support bar may increase the tension on link member 168 (and decrease the distance between the clamp's jaws), and lowering the support bar may decrease the tension on link member 168 (and increase the distance between the clamp's jaws).

Fine adjustment member 172 may be configured as a force indicator for clamp device 74, with the adjustment member being capable of toggling between at least two positions based on the magnitude of a force of the clamp (e.g., a clamp tension). The fine adjustment member may have portions that move relative to one another when force associated with the clamp device exceeds a threshold level. For example, the force may be tension on link member 168, and relative movement of portions of member 172 may occur when the tension exceeds a threshold corresponding to a minimum acceptable force applied by the gripping portion of clamp device 74. A change in the configuration (e.g., the shape) of the fine adjustment member in response to application of greater than a threshold level of force can provide visual feedback, tactile feedback (interchangeably termed haptic feedback), and/or aural feedback (interchangeably termed audible feedback) to the user that the clamp device is properly adjusted. The change in configuration may occur while the fine adjustment member or the coarse adjustment member is being manipulated. In some cases, the coarse adjustment member may be eliminated from the clamp device.

Figure 8:
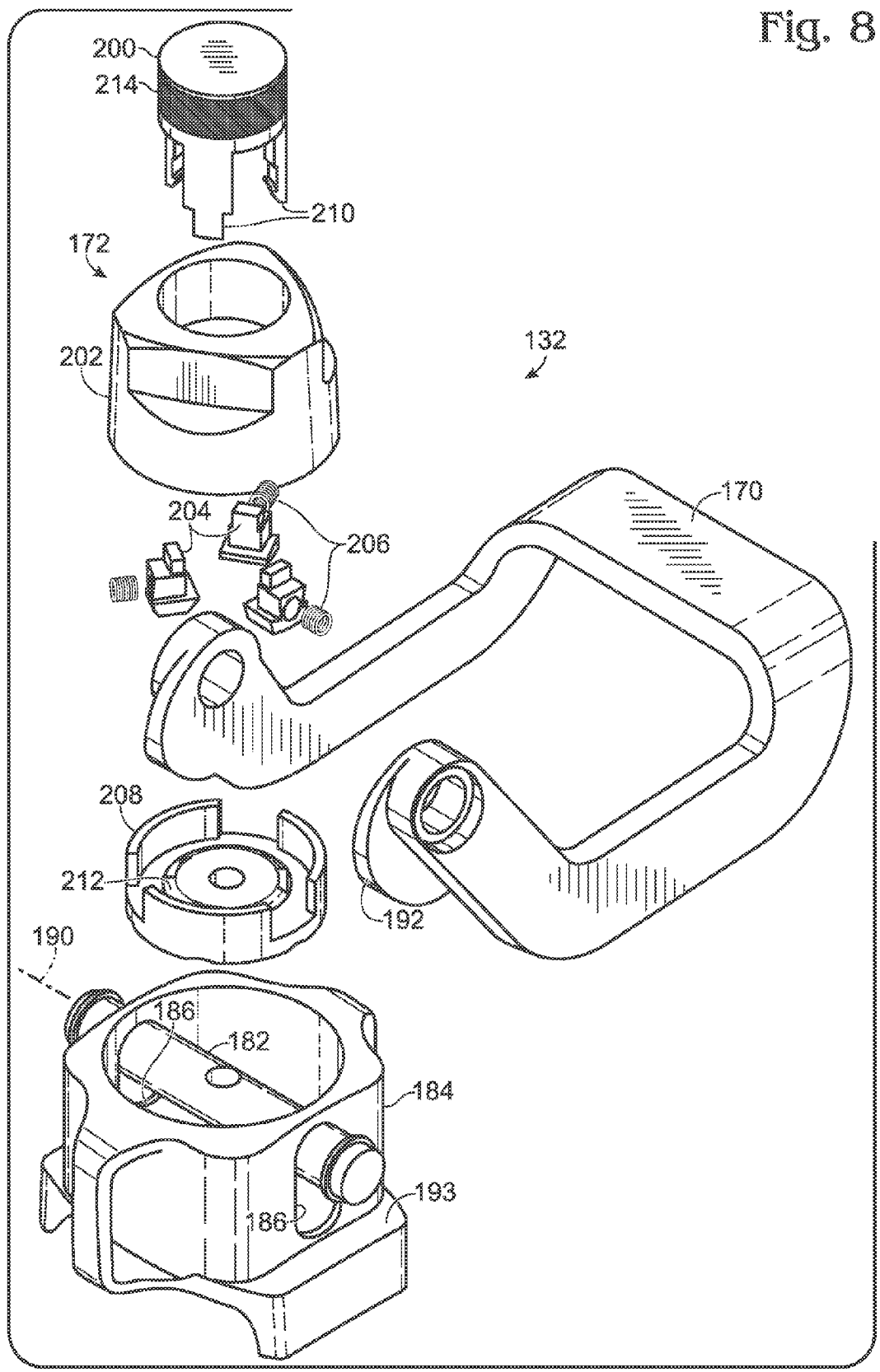
FIG. 8 is an exploded view of an adjustment mechanism of the clamp device of FIG. 6, with the adjustment mechanism including a force indicator.

FIG. 8 shows exemplary components of fine adjustment member 172. The fine adjustment member may include an indication member 200 (interchangeably termed an indicator), a body 202 (which may be described as a knob), at least one or a plurality of spacers 204 each biased by at least one biasing element (such as a spring 206), and a base member 208 (interchangeably termed a base). In some embodiments, the spacers may be omitted. In some embodiments, at least one biasing element may be arranged to be compressed in a direction at least generally parallel to the long axis of link member 168.

FIG. 7 shows how the components of fine adjustment member 172 may be assembled (also see FIG. 8). Indicator 200 may define a plurality of legs 210 that extend into and are retained by base 208. As result, indicator 200 may be fixed with respect to base 208. Body 202 may receive at least a portion of indicator 200 and base 208. A cavity 211 to receive spacers 204 may be defined between body 202 and base 208.

Figure 10:
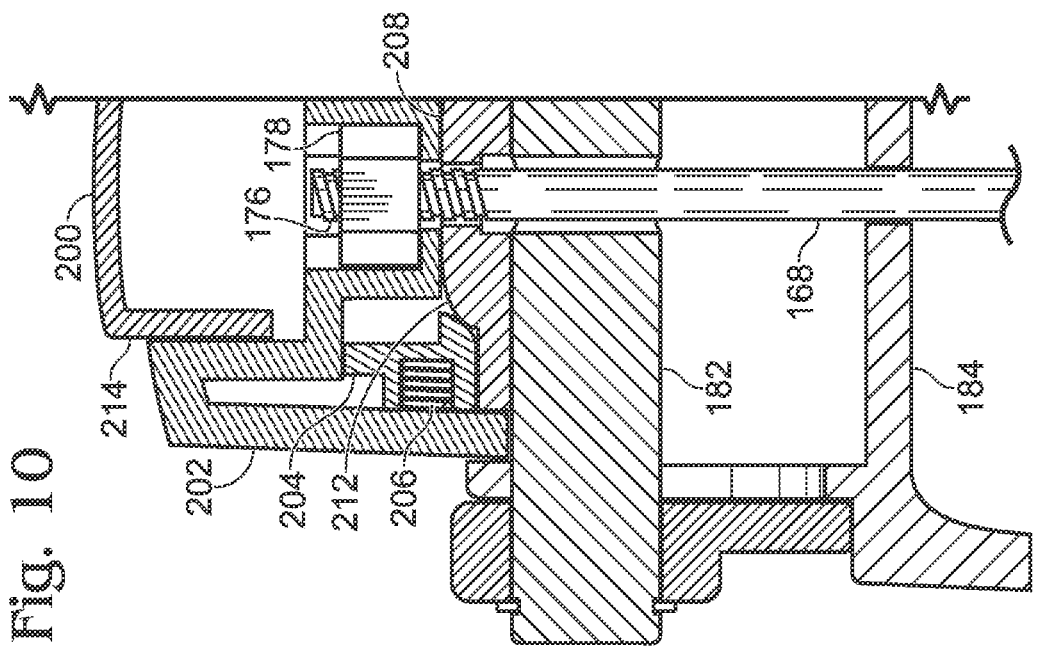
FIG. 10 is another fragmentary sectional view of the adjustment mechanism of FIG. 8, taken as in FIG. 9, but with the clamp device in a high-force configuration that is above the threshold level of force.
Figure 9:
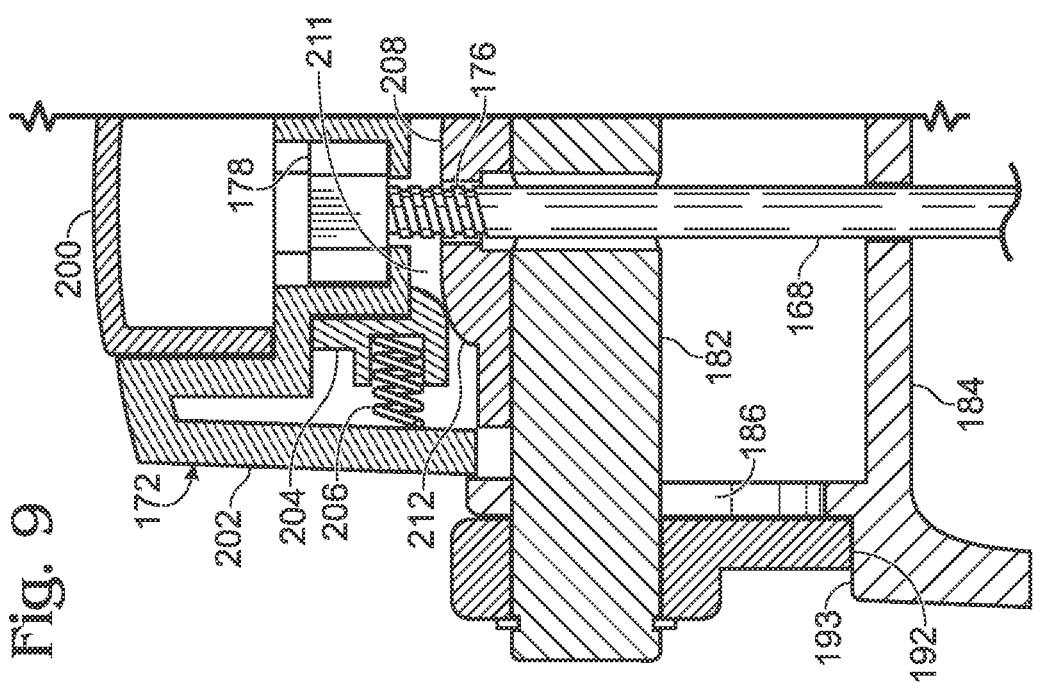
FIG. 9 is a fragmentary sectional view of the adjustment mechanism of FIG. 8, taken generally along line 9-9 of FIG. 7, with the clamp device in a low-force configuration that is below a threshold level of force.

FIGS. 9 and 10 show how spacers 204 and springs 206 may function to set a threshold level of force for changing the shape of fine adjustment member 172. In FIG. 9, the clamp device is in a low force configuration, and in FIG. 10 the clamp device is in a high force configuration, above the threshold force, which is indicated by the relative position of indicator 200. Each spacer may be urged radially inward by spring 206 in cavity 211.

In the low force configuration of FIG. 9, spacers 204 each may bear against a ramp 212 (interchangeably termed a cam surface region) defined by base 208 (or body 202). The radial force exerted by the springs produces a vertical force component that urges body 202 away from base 208 along a vertical axis (parallel to link member 168). Increasing the tension on link member 168 above a critical tension, as in FIG. 10, overcomes the spring force and causes the springs to compress and each spacer to travel down ramp 212. As a result, cavity 211 becomes smaller and the relative position of body 202 and base 208 changes, namely, the body moves downward relative to the base. Since indicator 200 is fixed to base 208, the relative position of body 202 and indicator 200 also changes in the same manner. As the spacers move out down and outward, the ramp angle may get steeper, which reduces the tension needed to overcome the springs. The net result may be a visible change in the shape of the fine adjustment member: indicator 200 may protrude from body 202 (or farther from the body). The indicator may have a colored wall region 214 (e.g., a green area; also see FIG. 8) that becomes exposed when the indicator protrudes, signaling to the user that the clamp device is adjusted properly. Protrusion of the indicator also or alternatively may provide a tactile indication that the clamp device is set properly, because the user's hand can feel the indicator protruding from the body. Furthermore, the fine adjustment member may produce a "click" when the position of the spacers changes within the cavity, to provide a haptic and/or audible indication that the clamp device is adjusted properly. Ramp 212 may be curved in cross section, as shown, to produce a nonlinear change (e.g., a more abrupt change) in the relative position of indicator 200 and body 202 as the tension on link member 168 is increased above a predetermined threshold level of force.

In some embodiments, indicator 200 may have multiple rings of different color to indicate to the user multiple tension settings. For example, the indicator may include a red colored region (such as a red ring) below a green colored region (e.g., a green ring) to indicate that the jaws of the clamp and/or adjustment member 172 have been tightened excessively (when the red ring is visible). Furthermore, the weight of the cargo load may alter the required clamp tension, so indicator 200 may include graduated color rings associated with cargo load weight ranges.

In some embodiments, adjustment member 172 may include at least two spring, spacer, and ramp assemblies having distinct positions along link member 168. For example, there may be at least one other spacer and ramp assembly, besides what is shown in FIGS. 7-10, thus making the indicator protrude in at least two increments, allowing the adjustment member to indicate multiple predetermined clamp tensions.

Clamp device 74 having a force indicator may be configured for other uses in vehicle-mountable carriers by, for example, modifying gripping portion 160 and/or adjustment portion 132. For example, the clamp device may be utilized for clamping a different type of carrier, such as a bicycle carrier or a boat carrier, among others, to a vehicle crossbar or vehicle rail. In other cases, the clamp device may have a pair of jaws and/or gripping regions to receive and retain a portion of an article of cargo, such as a region of a bicycle wheel, a bicycle frame, a boat, or the like. An exemplary wheel clamping device that may be configured to include a force indicator in an adjustment knob of the device is disclosed in U.S. Patent Application Publication No. 2011/0132946 A1, published Jun. 9, 2011, which is incorporated herein by reference.

III. EXEMPLARY LATCHING SYSTEM FOR A CARGO BOX

This section describes an exemplary latching system forming part of cargo box 60 of Section I; see FIGS. 11-25.

FIG. 11 shows a fragmentary sectional view of cargo box 60, including a hinge 220 of hinge-latch member 134*a*. Member 134*a*, and each of hinge-latch members 134*b*-134*d*, may include a hinge 220 and one or more latches. (The latches are not shown in FIG. 11, to simplify the presentation.) In some examples, member 134*a* may be structurally and/or functionally equivalent to member 134*c*, and member 134*b* may structurally and/or functionally equivalent to member 134*d*. In some examples, members 134*a*-134*d* all may be structurally and/or functionally equivalent to one another.

Hinge 220 may have a plurality of hinge members that can pivot with respect to one another about a plurality of axes. More particularly, the hinge may be described as a four-member (or four-bar) hinge having four members or bars that pivot with respect to one another about four pivot axes defined by a corresponding number of pivotal connections, such as at pivot pins 230. The hinge members may include an anchor member 222 that is fixed to lid portion 68 (or bottom portion 66), such as with fasteners 231, whether the box is open or closed. The hinge members also may include a receivable member 224 (interchangeably termed a latchable member), and a pair of connecting members 226 and 228 that separately and pivotably connect members 222 and 224 to each other. Hinge 220 defines a "virtual" pivot axis 232 for lid portion 68 with respect to bottom portion 66 that may be outside the box, and that may or may not move with respect to the bottom portion as the lid portion is pivoted. Generally, the position of virtual pivot axis 232 is the line at which a first plane, defined by the pivot axes at opposite ends of member 226, intersects a second plane, defined by the pivot axes at opposite ends of member 228. The use of a virtual pivot axis that is offset from the pivotal connections of the hinge, such as located outside the box, may facilitate the presence of a flush seam between the lid portion and the bottom portion, as shown. In other examples, hinge 220 may be replaced by another type of hinge, such as a conventional "two-bar" hinge having a pair of members pivotally connected to each other to define a single pivot axis.

Hinge member 224 may be received at least partially in a hinge receiver 234 of bottom portion 66 (or lid portion 68 if anchor member 222 is affixed to the bottom portion). The hinge receiver may be a discrete component attached to bottom shell 76, such as with fasteners, adhesive, bonding, and/or the like. Alternatively, the hinge receiver may be formed integrally with bottom shell 76. The hinge receiver may define a pocket 236 in which at least part of hinge member 224 can be received when the cargo box is closed. Hinge member 224 can be held in pocket 236 by one or more latches, to prevent the cargo box from opening at the hinge after the box is closed and latched, and to permit the cargo box to be opened on the opposite lateral side, with hinge 220 of member 134*a* functioning to permit pivotal motion of the lid portion with respect to the bottom portion.

FIG. 12 shows the same cargo box region and configuration as FIG. 11, but with additional components of hinge-latch member 134*a* visible. The hinge-latch member may include a latch 240 and a hinge lifter 242 (which, in some cases, may be described as an interlock or interlock member). Latch 240 is shown here in a latched configuration that holds hinge member 224 of hinge 220 in pocket 236 of hinge receiver 234.

Latch 240 may be operatively connected to a drive bar 244 of actuation mechanism 136*a* (also see FIG. 4), such that pivotal motion of the drive bar about its long axis causes latch 240 to pivot. The pivotal position of the drive bar and/or latch may be biased by one or more biasing elements, such as one or more torsion springs 246, which may engage hinge receiver 234 (and/or the bottom shell) and latch 240 (and/or bar 244). The biasing element(s) may urge latch 240 toward hinge member 224 (counterclockwise in FIG. 12), to achieve the latched configuration shown, and may maintain the latch in the latched configuration after the box is closed, such as during vehicle travel. Pivotal motion of drive bar 244 may result in simultaneous pivotal motion of at least a pair of latches 240, such as a latch 240 for each hinge-latch member on the corresponding lateral side of the box (e.g., a latch 240 for each of members 134*a* and 134*b*). Hinge lifter 242 may be engaged with a bottom side of hinge member 224 in the latched configuration shown, and may be biased upward by one or more biasing elements, which are not shown in FIG. 12, to simplify the presentation. In other embodiments, hinge member 222 of hinge 220 may be affixed to the bottom portion of the box, and lifter 242 may be included in the lid portion and may urge hinge member 224 in a downward direction out of a hinge receiver in the lid portion.

FIG. 13 shows the cargo box unlatched at hinge-latch member 134*a* (and hinge-latch member 134*b*). Drive bar 244 has been pivoted, which pivots latch 240 out of engagement with hinge member 224 of hinge 220, indicated by a pivot arrow at 250. Hinge lifter 242, due to its upward bias, pushes against the bottom side of hinge member 224, which urges hinge member 224 upward, indicated by an arrow at 252, in a direction out of pocket 236. Upward motion of hinge member 224 may be accompanied by a corresponding upward motion of lid portion 68, indicated by an arrow at 254, on the same lateral side of the box. The upward motion raises the lid portion slightly (compare FIGS. 12 and 13) on the unlatched side of the box, which shows the user that the box has been unlatched on one side and may make it easier for the user to grasp lip 104 for pivoting lid portion 68 further to open the box. In any event, latch 240 (and particularly a hook region thereof) may move in a generally lateral direction (away from central vertical plane 110 of the cargo box (see FIG. 3)), to place the latch in the unlatched configuration shown.

FIG. 14 shows lid portion 68 of cargo box 60 being pivoted, indicated by an arrow at 260, away from bottom portion 66, by a user, to open the box on one of its lateral sides for access to the box interior. Hinge 220 may remain connected to lid portion 68 and may travel with the lid portion upward and away from the bottom portion, as shown. Hinge lifter 242 may obstruct, indicated at 262, return of latch 240, indicated by an arrow at 264, to the position of FIG. 12, after the user is no longer urging drive bar 244 away from its biased orientation produced by spring(s) 246. Accordingly, when lid portion 68 is being returned to the closed configuration of FIG. 12, hinge member 224 can contact an end region 266 (or hook region) of latch 240, to urge the end region of the latch out of pocket 236 (clockwise in FIG. 14), until hinge member 224 is seated in the pocket, which then allows latch 240 to return to the latched configuration of FIG. 12. In other words, hinge member 224 may push lifter/interlock 242 down and/or out of the way, which allows both latches to move or be moved to their respective retaining/latched configurations.

FIG. 15 shows hinge-latch member 134a and an associated portion of actuation mechanism 136a, viewed from a position outside the cargo box in the absence of the upper and lower shells. Member 134a is shown in a closed and double-latched configuration of the cargo box. More particularly, hinge 220 is latched to the bottom portion of the cargo box, and particularly to hinge receiver 234, with a hook latch 240 and a pin latch 280. The hook latch may be a primary latch. The pin latch may be a safety latch that prevents the box from opening if the primary latch fails.

Hinge 220 is shown seated in hinge receiver 234, with hinge member 224 disposed in pocket 236 of the hinge receiver. Anchor hinge member 222 projects upward and attaches to the lid shell of the cargo box (also see FIG. 11). Anchor hinge member 222 may define a plurality of openings 282 that are arranged coaxially with apertures 100 of lower shell layer 82 of the lid portion.

Hinge lifter 242 may be biased upward by one or more biasing elements. For example, here, lifter 242 is biased by a pair of springs, namely, coil springs 284. In the depicted embodiment, each spring 284 is connected at its lower end to a respective projection 286 defined by lifter 242 and at its upper end to hinge receiver 234.

Hook latch 240 may be disposed at least predominantly at a cargo box position that is lateral to hinge receiver 234. End region 266 of the latch may project through a window 288 defined by the hinge receiver and into engagement with hinge 220 at hinge member 224.

Figure 16:
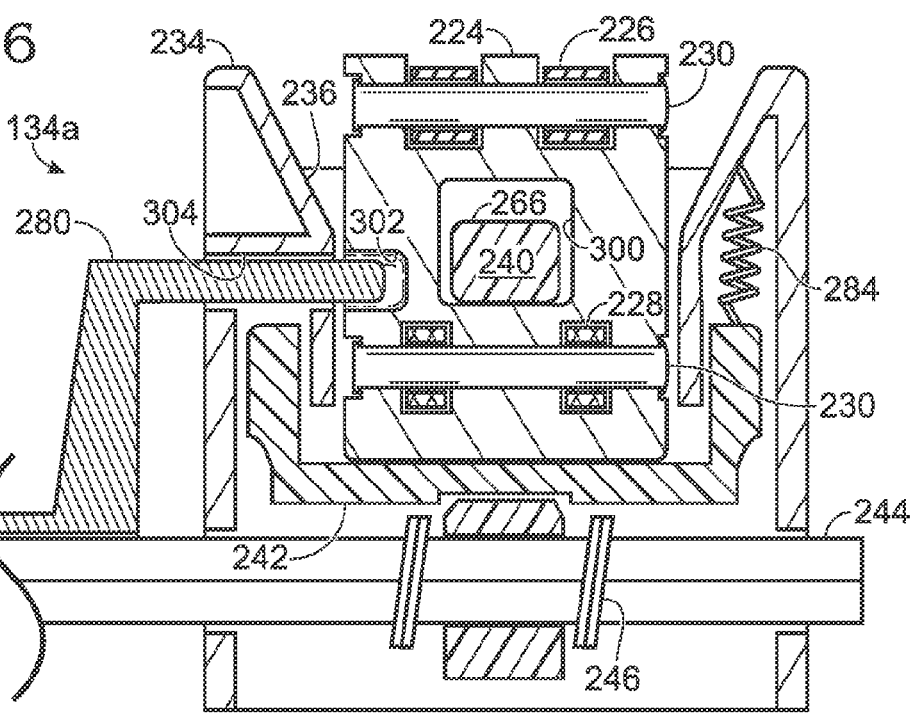
FIG. 16 is a fragmentary sectional view of selected aspects of the cargo box of FIG. 1, taken generally along line 16-16 of FIG. 12 toward the hinge-latch member of FIG. 15, with the box double-latched at the hinge-latch member by a pair of latches.

FIG. 16 shows a sectional view of the cargo box components of FIG. 15, with springs 246 and 284 represented somewhat schematically. Hinge member 224 is shown disposed in pocket 236 of hinge receiver 234. The pocket may be designed such that travel of hinge member 224 into and out of the pocket is not impeded by connecting hinge members 226 and 228.

Hinge member 224 may define an aperture (and/or a projection) to receive (and/or be received by) at least a portion of each latch 240, 280. For example, a first aperture 300 may be sized to receive end region 266 of hook latch 240. Aperture 300 may define an axis extending through opposite lateral sides of the cargo box when the hinge is seated as shown. In other words, aperture 300 may be configured to receive a portion of hook latch 240 traveling in a generally lateral to medial direction of the cargo box (or a generally medial to lateral direction), among others. A second aperture 302 may be sized to receive an end region of pin latch 280. The second aperture may define an axis that is transverse (e.g., orthogonal) to the axis defined by aperture 300. For example, second aperture 302 may define an axis that is parallel to the long axis of drive bar 244 and at least generally parallel to the long axis of the cargo box (e.g., within about 20 or 10 degrees of exactly parallel). Pin latch 280 may extend through an aperture 304 defined by hinge receiver 234 and into aperture 302. Latches 240 and 280 may provide a redundant retention of hinge member 224 in pocket 236. Accordingly, the box may remain latched at hinge-latch member 134a until each of latches 240 and 280 is removed from its respective aperture 300 or 302. In other embodiments, one or more of the latches may define an aperture that receives at least a portion of the hinge member to produce a latched configuration.

Figure 17:
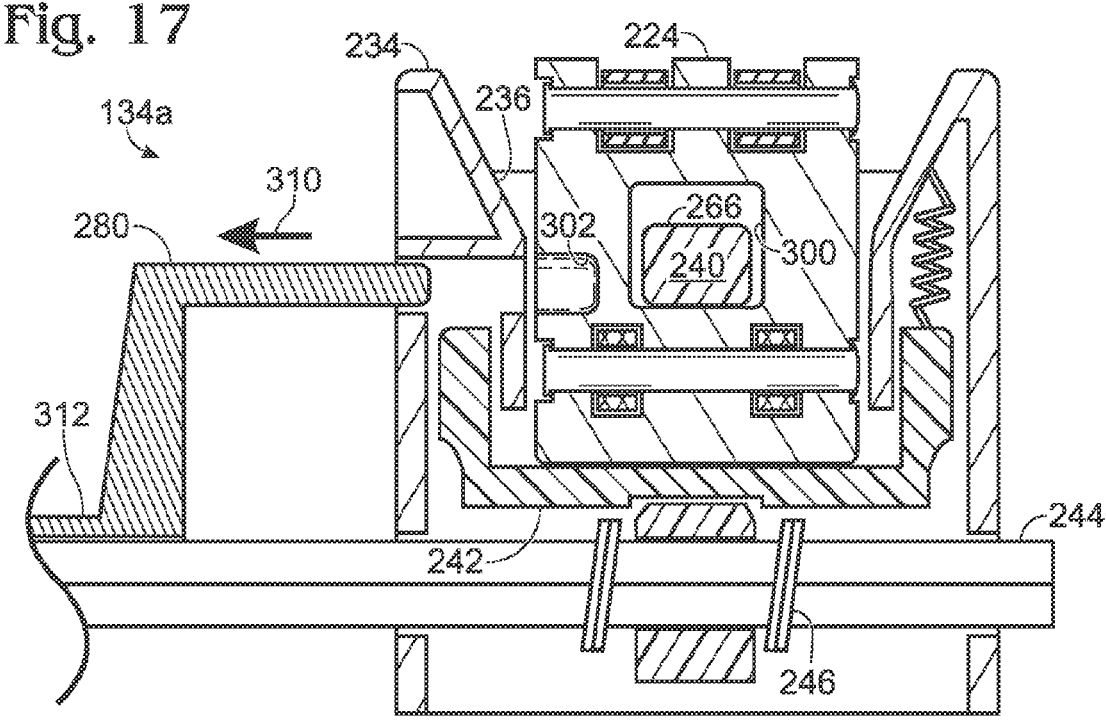
FIG. 17 is a sectional view of selected aspects of the cargo box of FIG. 1, taken generally as in FIG. 16, but with one of the latches moved to an unlatched configuration.

FIG. 17 shows hinge-latch member 134a as in FIG. 16, except in a single-latched configuration produced by removing pin latch 280 from aperture 302 of hinge member 224. Pin latch 280 may be unlatched by moving the latch in a direction parallel to drive bar 244, indicated by a motion arrow at 310. Pin latch 280 may have a base 312 arranged coaxially with bar 244 and slideable along the bar to move the end region of the pin latch into and out of aperture 302 (also see FIG. 15). Latch 240 still keeps hinge member 224 in pocket 236.

FIG. 18 shows hinge-latch member 134a as in FIG. 17, except in a fully unlatched configuration produced by removing hook latch 240 from aperture 300 of hinge member 224. Bar 244 has been pivoted, indicated at 320, to remove the end region of the hook latch from aperture 300 of hinge member 224. Accordingly, neither latch now prevents hinge lifter 242 from moving hinge member 224 in the direction of the lifter's bias, indicated by motion arrows at 322, at least partially out of pocket 236. Hinge lifter may act as an interlock have a blocking region 324 that obstructs travel of pin latch 280 when the hinge lifter is in its resting configuration, as shown. Accordingly, lifter/interlock 242 may prevent a user from placing the locking mechanism in the locked configuration when the box is unlatched, to reduce the chance of driving with the lid portion not secured. Also, blocking region 324 may function to prevent a user from moving the tip of pin latch 280 into pocket 236, after hinge member 224 has been completely removed from the pocket by opening the cargo box lid. Otherwise, the pin latch could prevent hinge member 224 from re-entering pocket 236 when the box is being closed, which would interfere with proper operation of the box.

FIGS. 19 and 20 show selected aspects of hinge-latch member 134a and actuation mechanism 136a, with hinge-latch member 134a in the double-latched configuration of FIGS. 15 and 16 (FIG. 19) or the unlatched configuration of FIG. 18 (FIG. 20). Actuation mechanism 136a may be adjusted with actuating member 116a and locking mechanism 118a to move each of latches 240 and 280 with respect to each other, and to move at least one of the latches independently of the other latch.

Locking mechanism 118a may be operatively connected to a slider 340 that includes pin latch 280. Slider 340 may include a coupler 342 and a body 344, which may be pivotably connected to one another at a joint 346 that permits coupler 342 to pivot with bar 244 while body 344 remains stationary. Coupler 342 may be configured to adjustably mesh with a sleeve 348 disposed around bar 244. For example, coupler 342 may define a plurality of teeth 350 that mesh with corresponding recesses 352 defined by sleeve 348.

Body 344 may be slideable parallel to bar 244. The body may include latch pin 280, base 312, and a slot 354 defined by a fin 356 of body 344 that projects from base 312. The slot may be disposed at an oblique angle, as shown, with respect to a vertical plane arranged orthogonal to bar 244.

Locking mechanism 118a may include a barrel 358, a base 360, and a pin 362. The housing of barrel 358 may have a fixed position with respect to the bottom portion of the cargo box. The barrel may be configured to receive a removable key that is manipulated by a user. Turning the key placed in the barrel may rotate base 360 with respect to the barrel. Pin 362 may be attached to base 360 at a position offset from the central axis of barrel 358. The pin may extend into slot 354. Accordingly, turning the key (e.g., about one-half turn), indicated by a motion arrow at 364 in FIG. 20, may change the position of pin 362 with respect to barrel 358, causing slot 354 (and thus body 344 and its pin latch 280) to travel in a direction parallel to the long axis of bar 244, indicated by a motion arrow at 366. As a result, latch pin 280 is withdrawn from aperture 302 of hinge member 224 (compare FIGS. 19 and 20) when the locking mechanism is adjusted from a locked configuration to an unlocked configuration.

Motion 366 of slider 340 away from the hinge of member 134a may mesh coupler 342 with sleeve 348 (see FIG. 20), indicated by an arrow at 367. As a result, coupler 342 and sleeve 348 become coupled and pivot as a unit, indicated by pivot arrows 368 and 370, when sleeve 348 is pivoted by manipulation of actuating member 116a, indicated at 372. This coupled pivotal motion results in pivotal motion of bar 244 and latch 240, to unlatch the cargo box at the hinge of member 134a (also see FIGS. 13 and 18), as described in more detail below.

Figure 21:
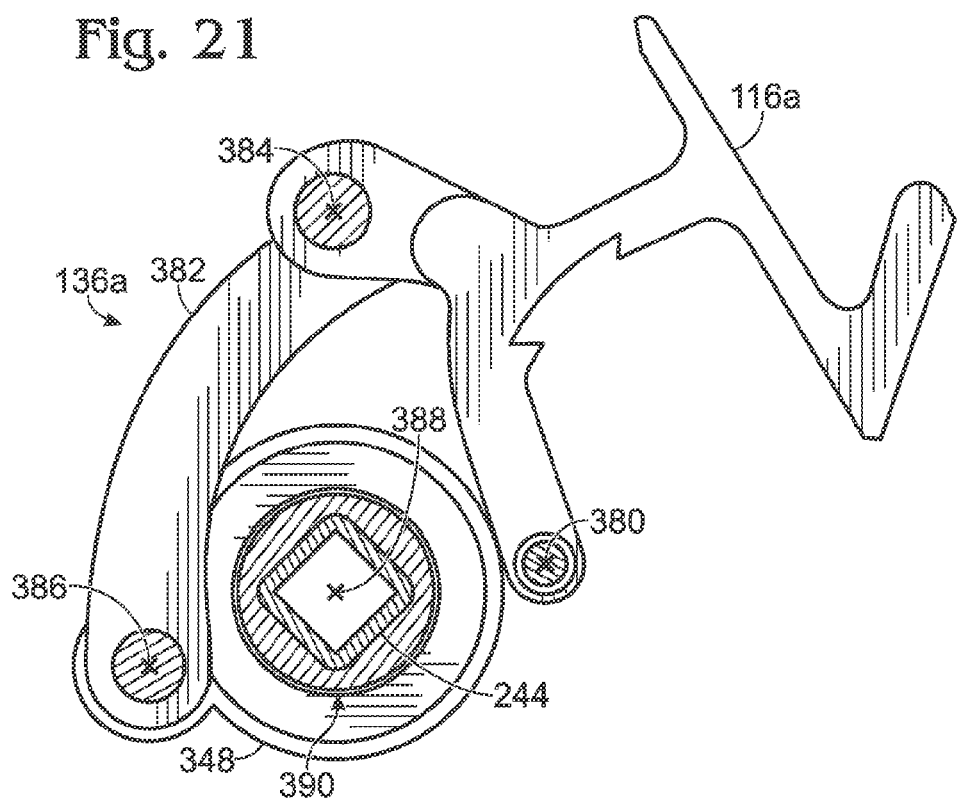
FIG. 21 is a sectional view of selected aspects of the actuation mechanism of FIG. 19, taken generally along line 21-21 of FIG. 19 toward a manipulable actuating member and through a drive bar of the actuation mechanism, with the actuating member in a resting configuration.

FIG. 21 shows selected aspects of actuation mechanism 136a, particularly actuating member 116a, bar 244, and sleeve 348, with actuating member 116a in a resting configuration. The actuating member may be described as a handle or a lever. The actuating member may be pivotally attached to the bottom portion (or lid portion) of the cargo box by at least one pivot joint defining a pivot axis 380 that is fixed with respect to the bottom portion (or lid portion) of the cargo box. The actuating member also may be pivotally attached to at least one arm 382, to define a movable pivot axis 384. Arm 382 may be pivotally connected to sleeve 348 to define another movable pivot axis 386. Finally, sleeve 348 may be pivotable about a fixed pivot axis 388 defined by bar 244. Accordingly, the actuating member, the bar, the sleeve, and the arm may form a four-member hinge with fixed pivot axes 380 and 388 and movable pivot axes 384 and 386.

Figure 22:
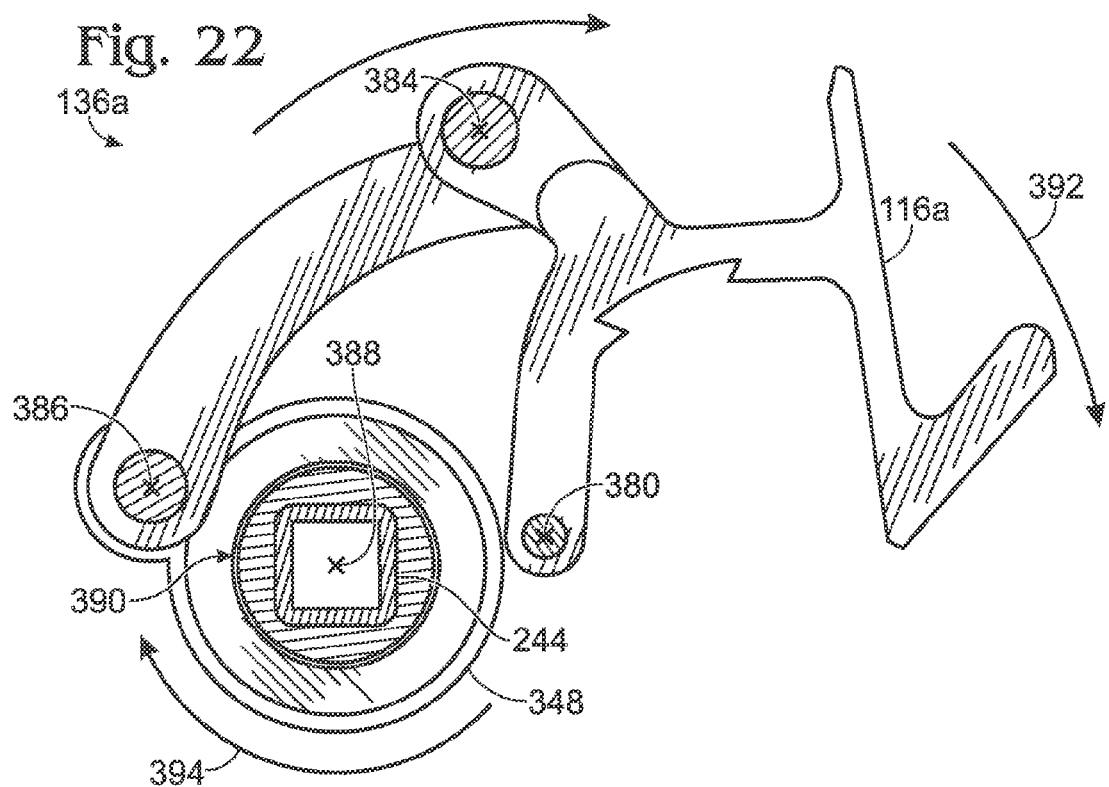
FIG. 22 is another sectional view of selected aspects of the actuation mechanism of FIG. 19, taken generally as in FIG. 21, but after movement of the actuating member from the resting configuration to pivot the drive bar.

Sleeve 348 may be configured to pivot about bar 244 by relative movement of surfaces indicated at 390, when the sleeve is not meshed with coupler 342 (as in FIG. 19). Accordingly, manipulating actuating member 116a in the unmeshed configuration of FIG. 19 does not result in pivotal motion of bar 244. However, as shown in FIG. 22, with coupler 342 meshed with sleeve 348 (see FIG. 20), pivotal motion of actuating member 116a, indicated at 392, results in coupled pivotal motion of sleeve 348 and bar 244, indicated at 394.

FIG. 23 shows a cross sectional view of coupler 342 and bar 244. Unlike sleeve 348, coupler 342 may be attached to bar 244 such that the coupler and bar always pivot as a unit.

FIG. 24 shows latch 240 extending into aperture 300 of hinge member 224 in a latched configuration. The rest of hinge 220 is not shown, to simplify the presentation. Bar 244 may extend through an aperture 400 defined by a base of latch 240, such that the bar and the latch are pivotally coupled.

FIG. 25 shows latch 240 removed from aperture 300 of hinge member 224 as a result of pivotal motion of bar 244.

Further aspects and hinges and latches that may be suitable for the cargo box are described in the patent documents listed above under Cross-References, which are incorporated herein by reference.

IV. SELECTED EMBODIMENTS

This section describes selected embodiments of the present disclosure related to cargo boxes, carriers having a clamp device with a force indicator, and methods of using the cargo boxes and carriers. The embodiments are intended for illustration and should not limit the scope of the present disclosure.

A1. A cargo box for a vehicle, comprising: (a) a bottom portion that mounts to crossbars above a vehicle; (b) a lid portion that fits together with the bottom portion to form a container for cargo, the container having a pair of lateral sides opposite each other; and (c) a plurality of hinge-latch members to connect the lid portion to the bottom portion adjacent each lateral side, a hinge-latch member adjacent each lateral side including a hinge, a first latch, and a second latch, the first and second latches each being adjustable individually to connect the lid portion to the bottom portion via the hinge.

A2. The cargo box of paragraph A1, wherein at least one of the hinge-latch members adjacent each lateral side has only a single latch that is adjustable to connect the lid portion to the bottom portion.

A3. The cargo box of paragraph A1 or A2, wherein the hinge remains attached to the lid portion if neither the first latch nor the second latch is adjusted to connect the lid portion to the bottom portion via the hinge.

A4. The cargo box of any of paragraphs A1 to A3, wherein at least one of the first and second latches pivots to secure the lid portion to the bottom portion at the hinge.

A5. The cargo box of paragraph A4, wherein the at least one latch includes a latch that pivots about a pivot axis that extends forward and rearward with respect to the container.

A6. The cargo box of paragraph A4, wherein the container defines a central long axis and a vertical plane containing the central long axis, and wherein the at least one latch includes a latch that pivots toward the vertical plane to secure the lid portion to the bottom portion via the hinge.

A7. The cargo box of any of paragraphs A1 to A6, wherein at least one of the first and second latches moves frontward or rearward with respect to the container to secure the lid portion to the bottom portion.

A8. The cargo box of any of paragraphs A1 to A7, wherein the first latch and the second latch move in respective transverse directions relative to each other to respective latched configurations that each secure the lid portion to the bottom portion via the hinge.

A9. The cargo box of any of paragraphs A1 to A8, wherein the first latch and the second latch each have a latched configuration and an unlatched configuration, wherein the hinge-latch member includes a hinge receiver and a hinge lifter, wherein the hinge lifter has a first position when the hinge is seated in the hinge receiver and a second position when the hinge is removed from the hinge receiver, and wherein the second position of the hinge lifter blocks adjustment of at least one of the first and second latches to the latched configuration from the unlatched configuration of the at least one latch.

A10. The cargo box of any of paragraphs A1 to A9, further comprising a locking mechanism that is adjustable to move the second latch between a latched configuration and an unlatched configuration, and wherein the first latch is operatively connectable to and operatively disconnectable from an actuating member by adjustment of the locking mechanism.

A11. The cargo box of paragraph A10, wherein the first latch is operatively connected to the actuating member when the second latch is in the unlatched configuration and is not operatively connected to the actuating member when the second latch is in the latched configuration.

A12. The cargo box of any of paragraphs A1 to A11, wherein the first and second latches include a primary latch and a safety latch.

B1. A cargo box for a vehicle, comprising: (a) a bottom portion that mounts to crossbars above a vehicle; (b) a lid portion that fits together with the bottom portion to form a container for cargo; (c) an actuating member; and (d) a plurality of hinge-latch members to connect the lid portion to the bottom portion, at least one of the plurality of hinge-latch members including a hinge, a first latch, and a second latch, the first latch being adjustable between a latched configuration and an unlatched configuration by manipulation of the actuating member when the second latch is in an unlatched configuration and not when the second latch is in a latched configuration.

B2. The cargo box of paragraph B1, further comprising a locking mechanism that is adjustable by manipulation of a removable key to move the second latch between a latched configuration and an unlatched configuration.

B3. The cargo box of paragraph B1 or B2, wherein the actuating member includes a graspable lever.

B4. The cargo box of any of paragraphs B1 to B3, wherein the first latch and the second latch move in respective directions that are transverse to each other when each latch is adjusted from an unlatched configuration to a latched configuration of the latch.

B5. The cargo box of any of paragraphs B1 to B4, wherein the first latch is a hook latch and the second latch is a pin latch.

C1. A cargo box for a vehicle, comprising: (a) a bottom portion that mounts to crossbars above a vehicle; (b) a lid portion that fits together with the bottom portion to form a container for cargo, the container having a pair of lateral sides opposite each other; (c) a pair of hinge-latch members to connect the lid portion to the bottom portion adjacent one of the lateral sides, each of the pair of hinge-latch members including a hinge and a latch, the hinge including a first hinge member and a second hinge member that remain pivotally connected to each other within the hinge when the container is opened on the one lateral side, one of the first hinge member and the latch defining an aperture that receives at least a portion of the other of the first member and the latch, to produce a latched configuration that secures the lid portion to the bottom portion at the hinge; and (d) a bar pivotally connected to the container and operatively connected to the latch of each of the pair of hinge-latch members such that pivotal motion of the bar moves each of the latches from the latched configuration to an unlatched configuration.

C2. The cargo box of paragraph C1, wherein the first hinge member and the second hinge member are connected to each other within the hinge by two or more pivotal connections defining a plurality of pivot axes that are offset from each other.

C3. The cargo box of paragraph C2, wherein each hinge defines a virtual pivot axis that is offset from each of the plurality of pivot axes.

C4. The cargo box of any of paragraphs C1 to C3, wherein the container defines a central long axis and a vertical plane containing the central long axis, and wherein the at least a portion of each latch moves away from the vertical plane when the latch is adjusted from the latched configuration to the unlatched configuration.

C5. The cargo box of any of paragraphs C1 to C4, wherein the bar is operatively connected to a graspable lever that is accessible to a user when the container is in a closed configuration.

C6. The cargo box of any of paragraphs C1 to C5, wherein each latch includes a hook that engages the first hinge member to secure the lid portion to the bottom portion.

C7. The cargo box of any of paragraphs C1 to C6, wherein the second hinge member remains affixed to the lid portion when the container is adjusted between an open configuration and a closed configuration on the one lateral side.

C8. The cargo box of any of paragraphs C1 to C7, wherein the container defines a central long axis and a vertical plane containing the central long axis, and wherein the aperture defines an axis that is transverse to the vertical plane when the lid portion is secured to the bottom portion on the one lateral side.

D1. A cargo box for a vehicle, comprising: (a) a bottom portion that mounts to crossbars above a vehicle; (b) a lid portion that fits together with the bottom portion to form a container for cargo, the container having a front end opposite a back end and a pair of lateral sides opposite each other; (c) a hinge connected to the container adjacent one of the lateral sides and including a first hinge member and a second hinge member, the hinge members remaining pivotally connected to each other within the hinge when the container is opened on the one lateral side; and (d) a latch adjustable from an unlatched configuration to a latched configuration by movement of the latch closer to the front end or the back end of the container, the latched configuration securing the lid portion to the bottom portion at the hinge.

D2. The cargo box of paragraph D1, wherein the hinge members are connected to each other within the hinge by one or more pivotal connections defining one or more pivot axes, and wherein the movement of the latch is along a path that is offset from each of the one or more pivot axes.

D3. The cargo box of paragraph D1 or D2, wherein the cargo box defines a long axis, and wherein the movement of the latch is along a path that is within 20 degrees of parallel to the long axis.

D4. The cargo box of any of paragraphs D1 to D3, wherein the hinge remains attached to the lid portion whether the container is open or closed on the one lateral side.

D5. The cargo box of any of paragraphs D1 to D4, wherein the first hinge member defines an aperture that receives at least a portion of the latch when the latch is adjusted to the latched configuration.

D6. The cargo box of any of paragraphs D1 to D5, wherein the hinge is a four-member hinge defining at least four pivot axes.

D7. The cargo box of any of paragraphs D1 to D6, further comprising a locking mechanism that is adjustable to move the latch between the unlatched configuration and the latched configuration.

D8. The cargo box of paragraph D7, wherein the locking mechanism is adjustable from outside the container with a removable key.

E1. A carrier mountable to an exterior of a vehicle, comprising: a clamp device including a gripping portion having a pair of jaws and also including an adjustment member that is rotatable as a unit to adjust a distance between the jaws, the adjustment member including a body and an indicator that exhibit a change in relative position when a force associated with the clamp device exceeds a threshold.

E2. The carrier of paragraph E1, wherein the gripping portion is configured to grip a crossbar mounted to a vehicle.

E3. The carrier of paragraph E2, further comprising a bottom portion and a lid portion that assemble with each other to form a container to hold cargo, wherein the gripping portion is attached to the bottom portion.

E4. The carrier of paragraph E3, wherein the adjustment member is inside the container.

E5. The carrier of any of paragraphs E1 to E4, further comprising a mount to attach the gripping portion to crossbars above a vehicle, wherein the gripping portion is configured to grip an article of cargo supported by the carrier.

E6. The carrier of paragraph E5, wherein the article of cargo is at least a portion of a bicycle.

E7. The carrier of any of paragraphs E1 to E6, wherein the adjustment member is operatively connected to the gripping portion by a threaded member, and wherein the change in relative position is produced if tension on the threaded member exceeds a threshold.

E8. The carrier of any of paragraphs E1 to E7, wherein the adjustment member is rotatable through a plurality of full revolutions to adjust the distance between the jaws.

E9. The carrier of any of paragraphs E1 to E8, wherein the indicator protrudes farther from the body when the adjustment member exhibits the change in relative position.

E10. The carrier of any of paragraphs E1 to E9, wherein the indicator is flush with the body before the adjustment member exhibits the change in relative position.

E11. The carrier of paragraph E10, wherein the indicator has a colored surface region that becomes exposed when the adjustment member exhibits the change in relative position.

E12. The carrier of any of paragraphs E1 to E11, further comprising an actuator that is manipulable to adjust the distance.

E13. The carrier of paragraph E12, wherein the actuator is configured to be pivoted by no more than about one-half turn.

E14. The carrier of paragraph E13, wherein pivoting the actuator a fraction of a full turn produces a larger change in the distance between the jaws than rotating the adjustment member a full turn.

E15. The carrier of paragraph E14, wherein the adjustment member is manipulable to produce a first change in the distance, and wherein the actuator is configured to be manipulated to produce a second change in the distance after manipulation of the adjustment member has produced the first change.

F1. A cargo box for a vehicle, comprising: (a) a bottom portion that mounts to crossbars above a vehicle; (b) a lid portion that assembles with the bottom portion to form a container to hold cargo; and (c) a plurality of clamp devices to mount the bottom portion to crossbars adjacent a vehicle, each clamp device including a pair of jaws and an adjustment member that is rotatable as a unit to adjust a distance between the jaws, the adjustment member including a body and an indicator that exhibit a change in relative position when a force associated with the clamp device exceeds a threshold.

F2. The cargo box of paragraph F1, wherein the adjustment member is operatively connected to one of the jaws at least in part by a threaded member, and wherein the change in relative position is produced when tension on the threaded member exceeds a threshold.

F3. The cargo box of paragraph F1 or F2, wherein the adjustment member is rotatable through a plurality of full revolutions to adjust the distance between the jaws.

F4. The cargo box of any of paragraphs F1 to F3, wherein the indicator protrudes farther from the body when the adjustment member exhibits the change in relative position.

F5. The cargo box of paragraph F4, wherein the indicator is substantially flush with the body before the adjustment member exhibits the change in relative position.

F6. The cargo box of any of paragraphs F1 to F5, wherein the indicator has a colored surface region that becomes exposed when the adjustment member exhibits the change in relative position.

F7. The cargo box of any of paragraphs F1 to F6, wherein each clamp device also includes an actuator that is manipulable to adjust the distance between the jaws.

F8. The cargo box of paragraph F7, wherein the actuator is configured to be pivoted no more than about one-half turn to adjust the distance between the jaws.

G1. A method of attaching a carrier to a crossbar, a vehicle rail, a vehicle, or an article of cargo, the method comprising: (a) disposing a portion of a crossbar, vehicle rail, vehicle, or article of cargo between jaws of a clamp device; (b) rotating an adjustment member as a unit to adjust a distance between the jaws, the adjustment member including a body and an indicator having a relative position with respect one another; and (c) gripping the portion with the jaws such that the relative position changes visibly.

G2. The method of paragraph G1, wherein the step of gripping produces a visible change in the relative position of the body and the indicator that indicates the clamp device is exerting a clamping force above a threshold force level.

While methods/devices for a vehicle-mounted carrier have been particularly shown and described, many variations may be made therein. This disclosure may include one or more independent or interdependent embodiments directed to various combinations of features, functions, elements and/or properties. Other combinations and sub-combinations of features, functions, elements and/or properties may be claimed later in a related application. Such variations, whether they are directed to different combinations or directed to the same combinations, whether different, broader, narrower or equal in scope, are also regarded as included within the subject matter of the present disclosure. Accordingly, the foregoing embodiments are illustrative, and no single feature or element, or combination thereof, is essential to all possible combinations that may be claimed in this or a later application. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

We claim:

1. A cargo box for a vehicle, comprising:
   a bottom portion that mounts to crossbars above a vehicle;
   a lid portion that fits together with the bottom portion to form a container for cargo, the container having a pair of lateral sides opposite each other; and
   a plurality of hinge-latch members to connect the lid portion to the bottom portion adjacent each lateral side, a hinge-latch member adjacent each lateral side including a hinge, a first latch, and a second latch, the first and second latches being discrete from the hinge and one another and movable individually with respect to the hinge to connect the lid portion to the bottom portion via the hinge;

wherein the hinge is mounted to one of the bottom portion and the lid portion, and wherein the first and second latches are configured to redundantly connect the hinge to the other of the bottom portion and the lid portion.

2. The cargo box of claim 1, wherein at least one of the hinge-latch members adjacent each lateral side has only a single latch that is adjustable to connect the lid portion to the bottom portion.

3. The cargo box of claim 1, wherein at least one of the first and second latches pivots to secure the lid portion to the bottom portion at the hinge.

4. The cargo box of claim 3, wherein the container defines a central long axis and a vertical plane containing the central long axis, and wherein the at least one latch includes a latch that pivots toward the vertical plane to secure the lid portion to the bottom portion via the hinge.

5. The cargo box of claim 1, wherein at least one of the first and second latches moves frontward or rearward with respect to the container to secure the lid portion to the bottom portion.

6. The cargo box of claim 1, wherein the first latch and the second latch move in respective transverse directions relative to each other to respective latched configurations that each secure the lid portion to the bottom portion via the hinge.

7. The cargo box of claim 1, wherein the first latch and the second latch each have a latched configuration and an unlatched configuration, wherein the hinge-latch member includes a hinge receiver and an interlock member, wherein the interlock member has a first position when the hinge is seated in the hinge receiver and a second position when the hinge is removed from the hinge receiver, and wherein the second position of the interlock member blocks adjustment of at least one of the first and second latches to the latched configuration from the unlatched configuration of the at least one latch.

8. The cargo box of claim 1, further comprising a locking mechanism that is adjustable to move the second latch between a latched configuration and an unlatched configuration, and wherein the first latch is operatively connectable to and operatively disconnectable from an actuating member by adjustment of the locking mechanism.

9. The cargo box of claim 8, wherein the first latch is operatively connected to the actuating member when the second latch is in the unlatched configuration and is not operatively connected to the actuating member when the second latch is in the latched configuration.

10. The cargo box of claim 1, wherein the first and second latches include a primary latch and a safety latch.

11. A cargo box for a vehicle, comprising:
a bottom portion that mounts to crossbars above a vehicle;
a lid portion that fits together with the bottom portion to form a container for cargo;
an actuating member; and
a plurality of hinge-latch members to connect the lid portion to the bottom portion, at least one of the plurality of hinge-latch members including a hinge, a first latch, and a second latch, the first latch being adjustable between a latched configuration and an unlatched configuration by manipulation of the actuating member when the second latch is in an unlatched configuration and not when the second latch is in a latched configuration;
wherein the first and second latches are discrete from the hinge and movable individually with respect to one another and the hinge for adjustment between latched and unlatched configurations, and
wherein each latch is mated with the hinge in the latched configuration of the latch and is not mated with the hinge in the unlatched configuration of the latch.

12. The cargo box of claim 11, further comprising a locking mechanism that is adjustable by manipulation of a removable key to move the second latch between a latched configuration and an unlatched configuration.

13. The cargo box of claim 11, wherein the actuating member includes a graspable lever.

14. The cargo box of claim 11, wherein the first latch and the second latch move in respective directions that are transverse to each other when each latch is adjusted from an unlatched configuration to a latched configuration of the latch.

15. The cargo box of claim 11, wherein the first latch is a hook latch and the second latch is a pin latch.

16. A cargo box for a vehicle, comprising:
a bottom portion that mounts to crossbars above a vehicle;
a lid portion that fits together with the bottom portion to form a container for cargo, the container having a pair of lateral sides opposite each other; and
a plurality of hinge-latch members to connect the lid portion to the bottom portion adjacent each lateral side, a hinge-latch member adjacent each lateral side including a hinge, a first latch, and a second latch, the first and second latches being discrete from the hinge and one another and movable individually with respect to the hinge to connect the lid portion to the bottom portion via the hinge;
wherein the first latch and the second latch move in respective transverse directions relative to each other to respective latched configurations that each secure the lid portion to the bottom portion via the hinge.

17. The cargo box of claim 16, wherein the first latch is a hook latch and the second latch is a pin latch.

* * * * *